United States Patent
Seo et al.

(10) Patent No.: US 9,369,256 B2
(45) Date of Patent: Jun. 14, 2016

(54) METHOD AND APPARATUS FOR TRANSMITTING ACK/NACK INFORMATION IN WIRELESS COMMUNICATION SYSTEM

(75) Inventors: Hanbyul Seo, Anyang-si (KR); Mingyu Kim, Anyang-si (KR); Hakseong Kim, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 14/002,934

(22) PCT Filed: Mar. 5, 2012

(86) PCT No.: PCT/KR2012/001604
§ 371 (c)(1),
(2), (4) Date: Nov. 25, 2013

(87) PCT Pub. No.: WO2012/118356
PCT Pub. Date: Sep. 7, 2012

(65) Prior Publication Data
US 2014/0071864 A1    Mar. 13, 2014

Related U.S. Application Data

(60) Provisional application No. 61/449,066, filed on Mar. 3, 2013, provisional application No. 61/486,745, filed on May 16, 2011.

(30) Foreign Application Priority Data

Feb. 28, 2012    (KR) .................. 10-2012-0020142

(51) Int. Cl.
*H04L 5/00*    (2006.01)
*H04L 1/18*    (2006.01)
*H04L 1/00*    (2006.01)

(52) U.S. Cl.
CPC ............ *H04L 5/0055* (2013.01); *H04L 1/1861* (2013.01); *H04L 5/001* (2013.01);

(Continued)

(58) Field of Classification Search
CPC ... H04L 1/1692; H04L 1/1861; H04L 5/0055; H04L 5/001; H04L 5/0044; H04L 5/0016; H04L 5/0048; H04L 5/0023; H04L 1/0073; H04J 3/1694; H04W 52/325; H04W 52/54
See application file for complete search history.

(56) References Cited

U.S. PATENT DOCUMENTS

2009/0290538 A1*  11/2009  Kim et al. ................. 370/328
2010/0275083 A1*  10/2010  Nam ................ H03M 13/6306
                                                        714/748

(Continued)

FOREIGN PATENT DOCUMENTS

CN    101431774 A    5/2009
CN    101505497 A    8/2009

(Continued)

OTHER PUBLICATIONS

3GPP TS 36.213, Oct. 2009.*

(Continued)

*Primary Examiner* — Jae Y Lee
*Assistant Examiner* — Aixa Guadalupe-Cruz
(74) *Attorney, Agent, or Firm* — Dentons US LLP

(57) ABSTRACT

A method and apparatus for transmitting ACK/NACK information in a wireless communication system are disclosed. In accordance with a method for transmitting ACK/NACK information, an ACK/NACK signal of downlink transmission in a downlink subframe set is transmitted in a single uplink subframe. In this case, if a first physical uplink control channel (PUCCH) format is established by a higher layer for a downlink receiver, and if one physical downlink shared channel (PDSCH) is transmitted in a downlink subframe set, the ACK/NACK information can be transmitted using a second PUCCH format on PUCCH resources established by a higher layer for the second PUCCH format.

10 Claims, 22 Drawing Sheets

(52) U.S. Cl.
CPC ............ *H04L 1/0073* (2013.01); *H04L 5/0016* (2013.01); *H04L 5/0023* (2013.01); *H04L 5/0044* (2013.01); *H04L 5/0048* (2013.01)

(56) References Cited

U.S. PATENT DOCUMENTS

| | | | | |
|---|---|---|---|---|
| 2011/0075624 | A1* | 3/2011 | Papasakellariou et al. | ... 370/329 |
| 2011/0199985 | A1* | 8/2011 | Cai | ........... H04L 1/0026 370/329 |
| 2011/0243066 | A1* | 10/2011 | Nayeb Nazar et al. | ....... 370/328 |
| 2012/0088533 | A1* | 4/2012 | Khoshnevis | ......... H04L 1/0026 455/509 |

FOREIGN PATENT DOCUMENTS

| | | |
|---|---|---|
| CN | 101588224 A | 11/2009 |
| JP | 2014503140 A | 2/2014 |
| WO | 2010053984 A2 | 5/2010 |

OTHER PUBLICATIONS

LG Electronics: "ACK/NACK on PUCCH for TDD", 3GPP Draft; R1-106099, 3rd Generation Partnership Project (3GPP), Mobile Competence Centre; 650, Route Des Lucioles; F-06921 Sophia-Antipolis Cedex; France, vol. RAN WG1, no. Jacksonville, USA; 20101115, Nov. 11, 2010, XP050489853.

Nokia Siemens Networks et al: "Remaining details for PUCCH A/N (FDD)", 3GPP Draft; R1-106193, 3rd Generation Partnership Project (3GPP), Mobile Competence Centre; 650, Route Des Lucioles; F-06921 Sophia-Antipolis Cedex; France, vol. RAN WG1, no. Jacksonville, USA; 20101115, Nov. 9, 2010, XP050466924.

NTT Docomo: "Remaining Issue for Format 3 Resource Allocation", 3GPP TSG RAN WG1 Meeting #63, R1-106174, Nov. 15-19, 2010.

Ericsson, ST-Ericsson: "Physical layer parameters to be configured by RRC", 3GPP TSG-RAN WG2 #71bis, R2-105685, Oct. 11-15, 2010.

3GPP TSG-RAN WG1 Meeting #62bis, R1-105153, "Resource Allocation for PUCCH Format 3", CATT, Oct. 11-15, 2010, pp. 1-3.

3GPP TSG RAN WG1 Meeting #62bis, R1-105152, "Remaining Details on PUCCH Format 3 in Rel-10", CATT, Oct. 11-15, 2009, pp. 1-3.

Huawei, Resource allocation for uplink ACK/NACK multiplexing, 3GPP TSG-RAN WG1 Meeting #62 R1-104282, Aug. 27, 2010.

Samsung, R-PDCCH search space design, 3GPP TSG-RAN WG1 Meeting #62 R1-104624, Aug. 27, 2010, p. 1-p. 3.

Huawei, et al., Way forward on A/N PUCCH resource allocation, 3GPP TSG-RAN WG1 Meeting #62bis R1-105777, Oct. 15, 2010.

NTT Docomo, Remaining issue on PUCCH resource allocation, 3GPP TSG-RAN WG1 Meeting #62bis R1-105429, Oct. 15, 2010.

Ericsson, "Efficient support of relays through MBSFN subframes", R1-084357, TSG-RAN WG1 #55, Prague, Czech Republic, Nov. 10-14, 2008.

* cited by examiner (a)

(b)

(a)

(b)

(a)

(b)

METHOD AND APPARATUS FOR TRANSMITTING ACK/NACK INFORMATION IN WIRELESS COMMUNICATION SYSTEM

This application is the U.S. National Phase of International Application Number PCT/KR2012/001604 filed on Mar. 5, 2012, which claims priority to U.S. Provisional Application No. 61/449,066 filed Mar. 3, 2011, U.S. Provisional Application No. 61/486,745 filed May 16, 2011 and Korean Patent Application No. 10-2012-0020142 filed Feb. 28, 2012, all of which are incorporated by reference for all purposes as if fully set forth herein.

TECHNICAL FIELD

The present invention relates to a wireless communication system, and more particularly to a method and apparatus for transmitting ACK/NACK information in a wireless communication system.

BACKGROUND ART

In a wireless communication system, Hybrid Automatic Repeat Request (HARQ) ACK/NACK information indicating whether data transmitted from a transmitter has been successfully decoded by a receiver can be transmitted from a receiver from the transmitter. For example, an error detection code (for example, cyclic redundancy check (CRC)) may be added to data transmitted from the transmitter in units of a codeword, such that the receiver may generate ACK/NACK information in units of a codeword. For example, information as to whether one codeword is successfully decoded may be represented by ACK/NACK information of 1 bit.

DISCLOSURE

Technical Problem

Accordingly, the present invention is directed to a method and apparatus for transmitting ACK/NACK information in a wireless communication system that substantially obviate one or more problems due to limitations and disadvantages of the related art. An object of the present invention devised to solve the problem lies in an uplink control channel format for transmitting uplink ACK/NACK information in response to downlink data transmission and a method for determining an uplink control channel resource.

The technical problems to be solved by the present invention are not limited to the above-described technical problems and other technical problems which are not described are understood by those skilled in the art from the following description.

Technical Solution

The object of the present invention can be achieved by providing a method for transmitting ACK/NACK information by a downlink receiver in a wireless communication system, the method comprising: determining a physical uplink control channel (PUCCH) format and resource which are used for transmitting ACK/NACK information for downlink transmission within a downlink subframe set including M (M≥1) downlink subframe; and transmitting the ACK/NACK information using the PUCCH format and resource in a single uplink subframe, wherein, for the downlink receiver configured with a first PUCCH format, if a single physical downlink shared channel (PDSCH) is transmitted within the downlink subframe set, the ACK/NACK information is transmitted using a second PUCCH format on a PUCCH resource configured by a higher layer for the second PUCCH format.

In another aspect of the present invention, a method for receiving ACK/NACK information from a downlink receiver by a downlink transmitter in a wireless communication system, the method comprising: performing downlink transmission within a downlink subframe set including M downlink subframes (where M≥1); and receiving ACK/NACK information in response to the downlink transmission in a single uplink subframe, wherein, for the downlink receiver configured with a first PUCCH format, if a single physical downlink shared channel (PDSCH) is transmitted within the downlink subframe set, the ACK/NACK information is received using a second PUCCH format on a PUCCH resource configured by a higher layer for the second PUCCH format.

In another aspect of the present invention, a downlink reception apparatus for transmitting ACK/NACK information in a wireless communication system, the apparatus comprising: a reception module for receiving a downlink signal from a downlink transmission apparatus; a transmission module for transmitting an uplink signal to the downlink transmission apparatus; and a processor for controlling the downlink reception apparatus including the reception module and the transmission module, wherein the processor is configured to: determine a physical uplink control channel (PUCCH) format and resource which are used for transmitting ACK/NACK information for downlink transmission within a downlink subframe set including M (M≥1) downlink subframes and transmit the ACK/NACK information using the PUCCH format and resource in a single uplink subframe, wherein, for the downlink reception apparatus configured with a first PUCCH format, if a single physical downlink shared channel (PDSCH) is transmitted within the downlink subframe set, the ACK/NACK information is transmitted using a second PUCCH format on a PUCCH resource configured by a higher layer for the second PUCCH format.

In another aspect of the present invention, a downlink transmission apparatus for receiving ACK/NACK information in a wireless communication system, the apparatus comprising: a reception module for receiving an uplink signal from a downlink reception apparatus; a transmission module for transmitting a downlink signal to the downlink reception apparatus; and a processor for controlling the downlink transmission apparatus including the reception module and the transmission module, wherein the processor is configured to: perform downlink transmission within a downlink subframe set including M downlink subframes (where M≥1) through the transmission module; and receive ACK/NACK information in response to the downlink transmission in a single uplink subframe through the reception module, wherein, for the downlink reception apparatus configured with a first PUCCH format, if a single physical downlink shared channel (PDSCH) is transmitted within the downlink subframe set, the ACK/NACK information is received using a second PUCCH format on a PUCCH resource configured by a higher layer for the second PUCCH format.

A physical downlink control channel (PDCCH) for the downlink receiver may be mapped at the remaining OFDM symbols other than initial N OFDM symbols (where N≤3) of a subframe.

The physical downlink control channel (PDCCH) for the downlink receiver may be an R-PDCCH or e-PDCCH.

If two or more downlink assignment PDCCHs are transmitted within the downlink subframe set, one PUCCH resource for first PUCCH format from among PUCCH resources configured by a higher layer for the first PUCCH format may be decided by a transmission power control (TPC) field of a PDCCH having a downlink assignment index (DAI) higher than 1 (DAI>1).

The ACK/NACK information may be transmitted using the first PUCCH format on the decided one PUCCH resource for the first PUCCH format.

The first PUCCH format may be PUCCH format 3, and the second PUCCH format may be PUCCH format 1a/1b.

The wireless communication system may be a time division duplex (TDD) wireless communication system.

More than one serving cells may be configured for the downlink receiver.

The downlink receiver may be a relay node (RN).

The above general description of the present invention and a detailed description thereof which will be described hereinbelow are exemplary and are for an additional description of the invention disclosed in the accompanying claims.

Advantageous Effects

Exemplary embodiments of the present invention have the following effects. The embodiments of the present invention can correctly determine uplink control channel resources for transmitting uplink ACK/NACK information in response to downlink data transmission.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
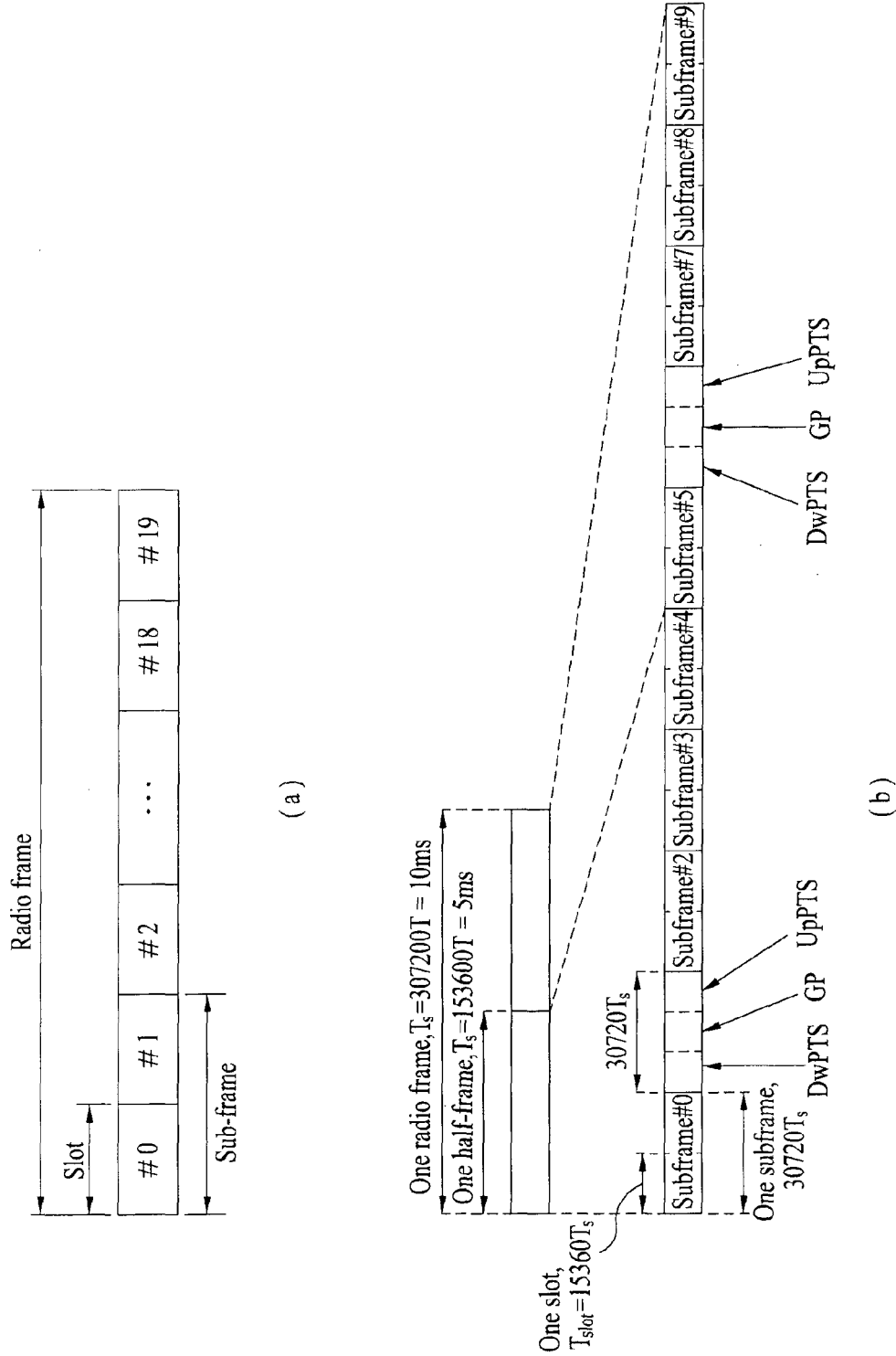
FIG. 1 exemplarily shows a radio frame structure.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

The structure of a radio frame in 3GPP LTE system will be described with reference to FIG. 1.

In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in time domain. A time required for transmitting one subframe is defined in a Transmission Time Interval (TTI). For example, one subframe may have a length of 1 ms and one slot may have a length of 0.5 ms. One slot may include a plurality of OFDM symbols in time domain and include a plurality of Resource Blocks (RBs) in frequency domain. Since the 3GPP LTE system uses OFDMA in downlink, the OFDM symbol indicates one symbol duration. The OFDM symbol may, be called a SC-FDMA symbol or a symbol duration. A RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If a channel state is instable, for example, if a User Equipment (UE) moves at a high speed, the extended CP may be used in order to further reduce interference between symbols.

FIG. 1(b) is a diagram showing the structure of the type 2 radio frame. The type 2 radio frame includes two half frames, each of which includes five subframes, a downlink pilot time slot (DwPTS), a guard period (GP), and an uplink pilot time slot (UpPTS). One of these subframes includes two slots. The DwPTS is used for initial cell search, synchronization and channel estimation at a user equipment. The UpPTS is used for channel estimation and uplink transmission synchronization of the user equipment. The guard period is to remove interference occurring in an uplink due to multi-path delay of a downlink signal between the uplink and a downlink. Meanwhile, one subframe includes two slots regardless of a type of the radio frame.

The structure of the radio frame is only exemplary. Accordingly, the number of subframes included in the radio frame, the number of slots included in the subframe or the number of symbols included in the slot may be changed in various manners.

Figure 2:
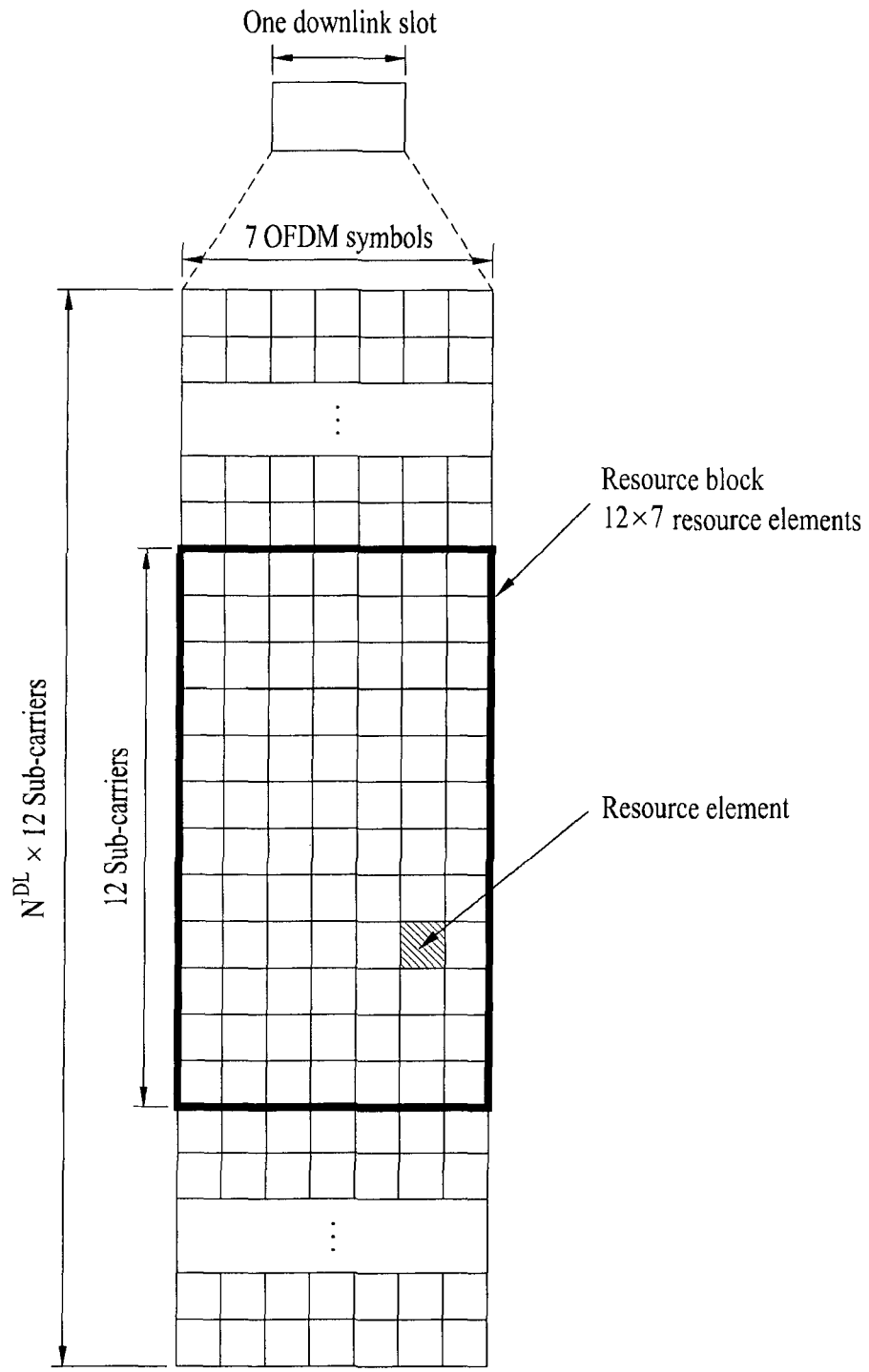
FIG. 2 exemplarily shows a resource grid of a downlink (DL) slot.

FIG. 2 is a diagram showing a resource grid in a downlink slot. Although one downlink slot includes seven OFDM symbols in a time domain and one RB includes 12 subcarriers in a frequency domain in the figure, the present invention is not limited thereto. For example, in case of a normal Cyclic Prefix (CP), one slot includes 7 OFDM symbols. However, in case of an extended CP, one slot includes 6 OFDM symbols. Each element on the resource grid is referred to as a resource element. One RB includes 12×7 resource elements. The number $N^{DL}$ of RBs included in the downlink slot is determined based on a downlink transmission bandwidth. The structure of the uplink slot may be equal to the structure of the downlink slot.

Figure 3:
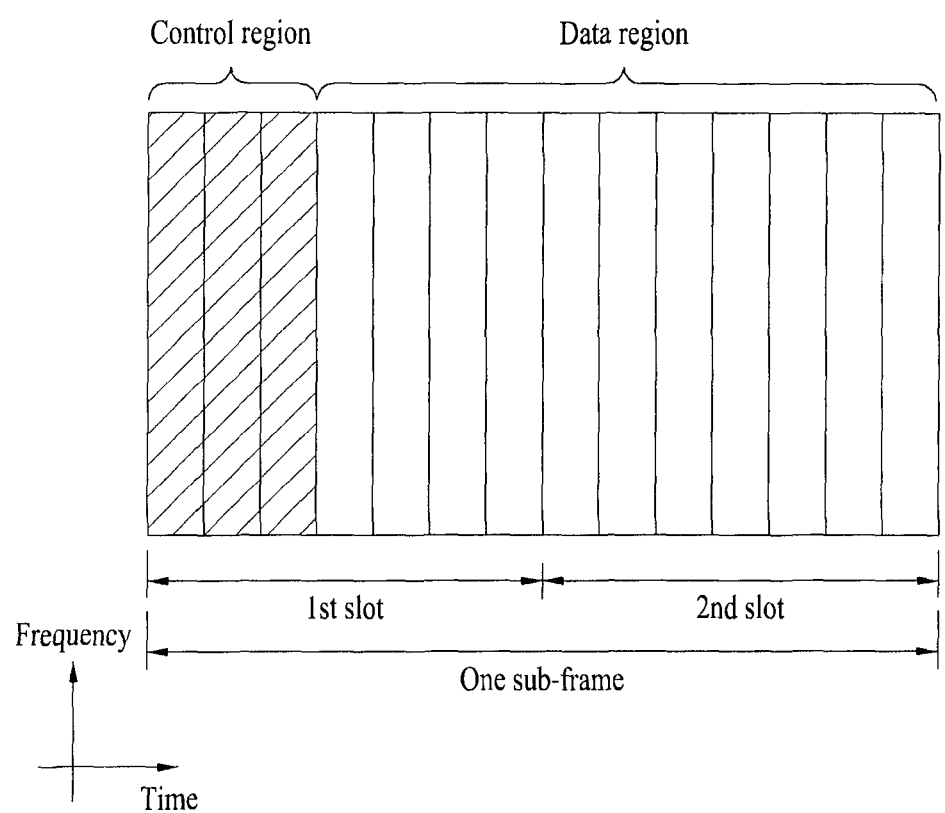
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response of uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of an higher layer control message such as a Random Access Response (RAR) transmitted on the PDSCH, a set of transmit power control commands for an individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several consecutive control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
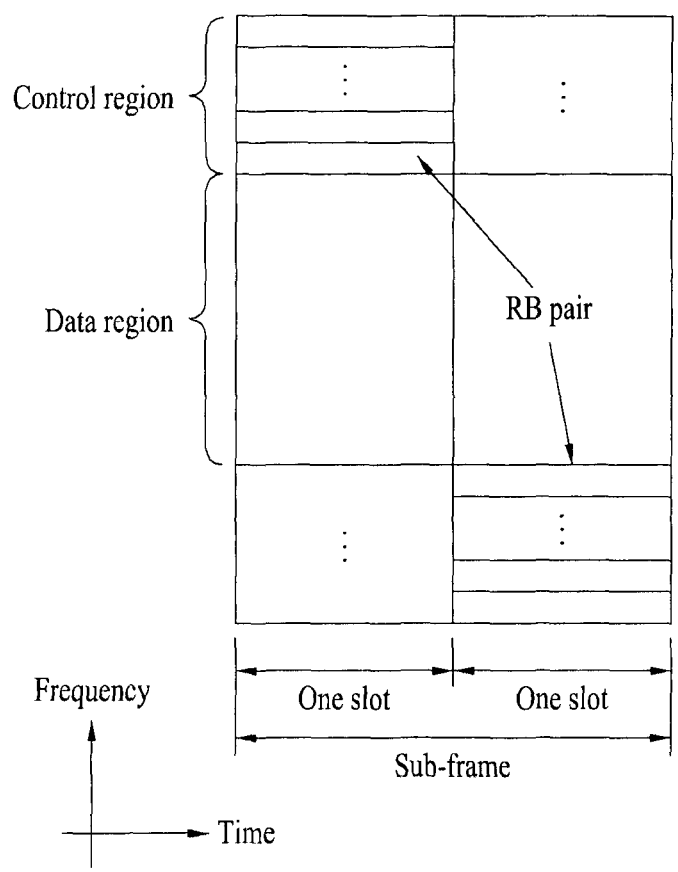
FIG. 4 is an uplink (UL) subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. The PUCCH for one UE is allocated to a RB pair in a subframe. RBs belonging to the RB pair occupy different subcarriers with respect to two slots. Thus, the RB pair allocated to the PUCCH is "frequency-hopped" at a slot boundary.

Modeling of Multi-Input Multi-Output (MIMO) System

Figure 5:
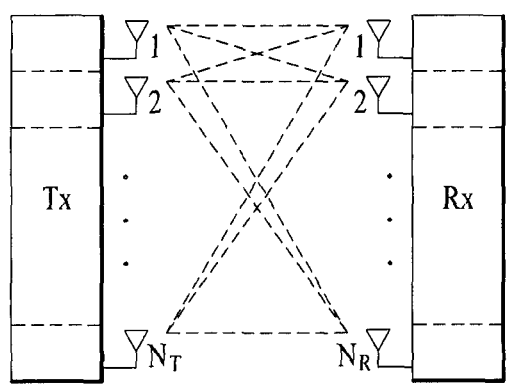
FIG. 5 is a conceptual diagram illustrating the configuration of a wireless communication system having multiple antennas.
Figure 5:
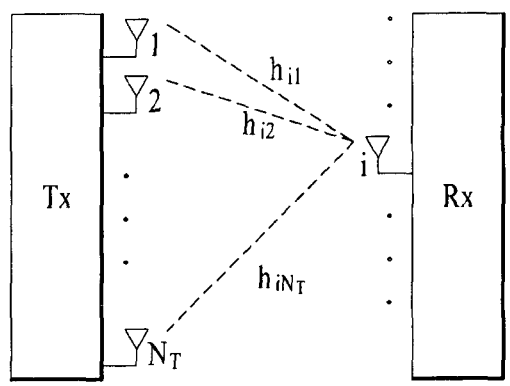

FIG. 5 is a diagram showing the configuration of a radio communication system having multiple antennas.

As shown in FIG. 5(*a*), if the number of transmission antennas is increased to $N_T$ and the number of reception antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate $R_0$ upon using a single antenna and a rate increase ratio $R_i$.

$$R_i = \min(N_T, N_R) \quad \text{[Equation 1]}$$

For example, in an MIMO system using four transmission antennas and four reception antennas, it is possible to theoretically acquire a transfer rate which is four times that of a single antenna system.

The communication method of the MIMO system will be described in more detail using mathematical modeling. In the above system, it is assumed that $N_T$ transmission antennas and $N_R$ reception antennas are present.

In transmitted signals, if the $N_T$ transmission antennas are present, the number of pieces of maximally transmittable information is $N_T$. The transmitted information may be expressed as follows.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed as follows.

$$s\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Consider that the $N_T$ actually transmitted signals $x_1, x_2, \ldots, x_{N_T}$ are configured by applying a weight matrix W to the information vector $\hat{S}$ with the adjusted transmit powers. The weight matrix W serves to appropriately distribute the transmitted information to each antenna according to a transport channel state, etc. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

where, $w_{ij}$ denotes a weight between an i-th transmission antenna and j-th information. W is also called a precoding matrix.

In received signals, if the $N_R$ reception antennas are present, respective received signals $y_1, y_2, \ldots, y_{N_R}$ of the antennas are expressed as follows.

$$y = [y_1, y_2, \ldots, y_{N_R}]^T \quad \text{[Equation 6]}$$

If channels are modeled in the MIMO radio communication system, the channels may be distinguished according to transmission/reception antenna indexes. A channel from the transmission antenna j to the reception antenna i is denoted by $h_{ij}$. In $h_{ij}$, it is noted that the indexes of the reception antennas precede the indexes of the transmission antennas in view of the order of indexes.

FIG. 5(*b*) is a diagram showing channels from the $N_T$ transmission antennas to the reception antenna i. The channels may be combined and expressed in the form of a vector and a matrix. In FIG. 5(*b*), the channels from the $N_T$ transmission antennas to the reception antenna i may be expressed as follows.

$$h_i^T = [h_{i1}, h_{i2}, \ldots, h_{iN_T}] \quad \text{[Equation 7]}$$

Accordingly, all the channels from the $N_T$ transmission antennas to the $N_R$ reception antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

An Additive White Gaussian Noise (AWGN) is added to the actual channels after a channel matrix H. The AWGN $n_1$, $n_2$, ..., $n_{N_R}$ added to the $N_T$ transmission antennas may be expressed as follows.

$$n = [n_1, n_2, \ldots, n_{N_R}]^T$$ [Equation 9]

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$ [Equation 10]

The number of rows and columns of the channel matrix H indicating the channel state is determined by the number of transmission and reception antennas. The number of rows of the channel matrix H is equal to the number $N_R$ of reception antennas and the number of columns thereof is equal to the number $N_T$ of transmission antennas. That is, the channel matrix H is an $N_R \times N_T$ matrix.

The rank of the matrix is defined by the smaller of the number of rows or columns, which is independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

When the matrix is subjected to Eigen value decomposition, the rank may be defined by the number of Eigen values excluding 0. Similarly, when the matrix is subjected to singular value decomposition, the rank may be defined by the number of singular values excluding 0. Accordingly, the physical meaning of the rank in the channel matrix may be a maximum number of different transmittable information in a given channel.

Reference Signal (RS)

In a radio communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS.

A downlink RS includes a Common RS (CRS) shared among all UEs in a cell and a Dedicated RS (DRS) for only a specific-UE. It is possible to provide information for channel estimation and demodulation using such RSs.

The reception side (UE) estimates the channel state from the CRS and feeds back an indicator associated with channel quality, such as a Channel Quality Indicator (CQI), a Precoding Matrix Index (PMI) and/or a Rank Indicator (RI), to the transmission side (eNodeB). The CRS may be also called a cell-specific RS. Alternatively, an RS associated with the feedback of Channel State Information (CSI) such as CQI/PMI/RI may be separately defined as a CSI-RS.

The DRS may be transmitted through REs if data demodulation on a PDSCH is necessary. The UE may receive the presence/absence of the DRS from a higher layer and receive information indicating that the DRS is valid only when the PDSCH is mapped. The DRS may be also called a UE-specific RS or a Demodulation RS (DMRS).

Figure 6:
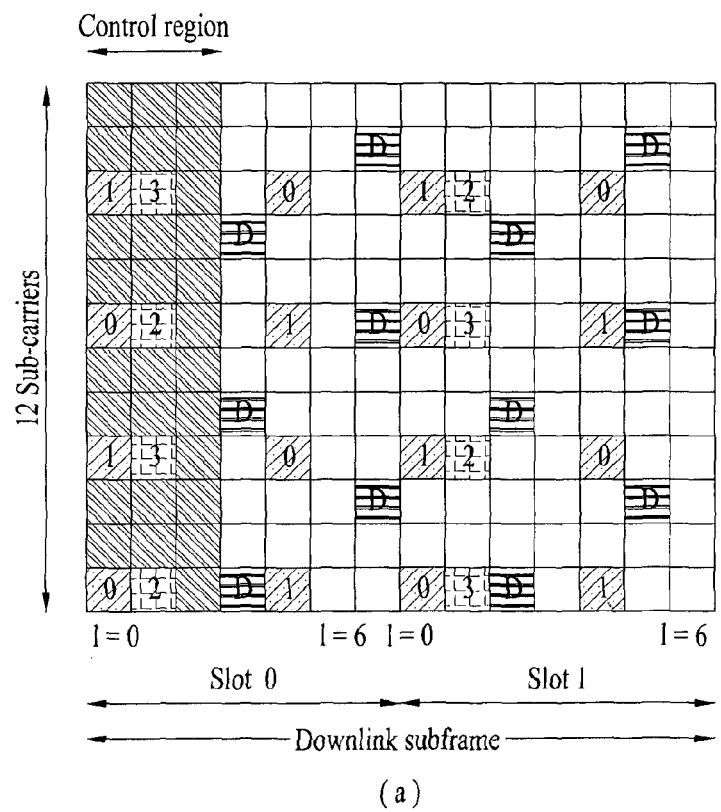
FIG. 6 is a conceptual diagram illustrating a downlink reference signal.
Figure 6:
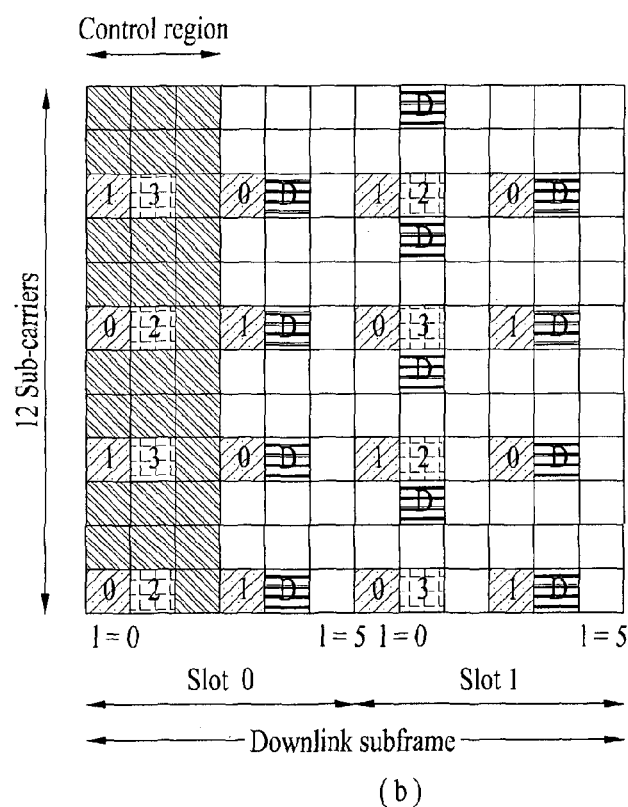

FIG. 6 is a diagram showing a pattern of CRSs and DRSs mapped on a downlink RB pair defined in the existing 3GPP LTE system (e.g., Release-8). The downlink RB pair as a mapping unit of the RSs may be expressed in units of one subframe on a time domain×12 subcarriers on a frequency domain. That is, on the time axis, one RB pair has a length of 14 OFDM symbols in case of the normal CP (FIG. 6(a)) and has a length of 12 OFDM symbols in case of the extended CP (FIG. 6(b)).

Figure 7:
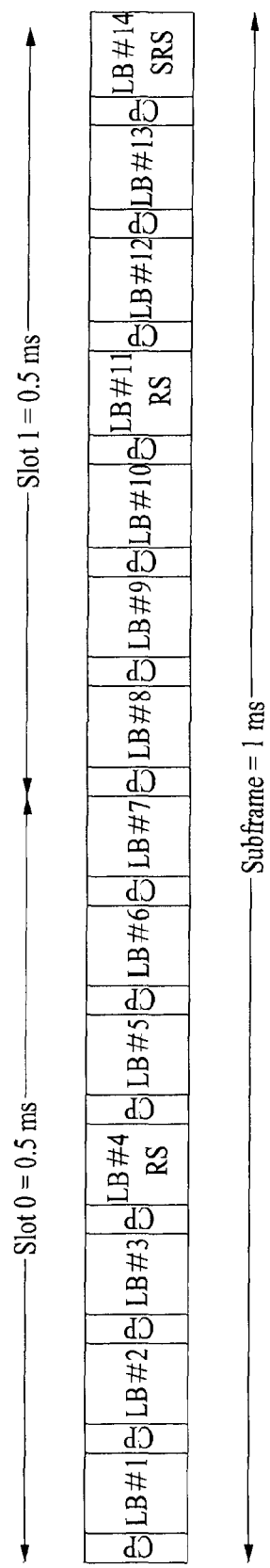
FIG. 7 is a conceptual diagram illustrating a sounding reference signal (SRS)

FIG. 6 shows the locations of the RSs on the RB pair in the system in which the eNodeB supports four transmission antennas. In FIG. 7, Resource Elements (REs) denoted by "0", "1", "2" and "3" indicate the locations of the CRSs of the antenna port indexes 0, 1, 2 and 3, respectively. In FIG. 6, the RE denoted by "D" indicates the location of the DRS.

Hereinafter, the CRS will be described in detail.

The CRS is used to estimate the channel of a physical antenna and is distributed over the entire band as an RS which is able to be commonly received by all UEs located within a cell. The CRS may be used for CSI acquisition and data demodulation.

The CRS is defined in various formats according to the antenna configuration of the transmission side (eNodeB). The 3GPP LTE (e.g., Release-8) system supports various antenna configurations, and a downlink signal transmission side (eNodeB) has three antenna configurations such as a single antenna, two transmission antennas and four transmission antennas. If the eNodeB performs single-antenna transmission, RSs for a single antenna port are arranged. If the eNodeB performs two-antenna transmission, RSs for two antenna ports are arranged using a Time Division Multiplexing (TDM) and/or Frequency Division Multiplexing (FDM) scheme. That is, the RSs for the two antenna ports are arranged in different time resources and/or different frequency resources so as to be distinguished from each other. In addition, if the eNodeB performs four-antenna transmission, RSs for four antenna ports are arranged using the TDM/FDM scheme. The channel information estimated by the downlink signal reception side (UE) through the CRSs may be used to demodulate data transmitted using a transmission scheme such as single antenna transmission, transmit diversity, closed-loop spatial multiplexing, open-loop spatial multiplexing, or Multi-User MIMO (MU-MIMO).

If multiple antennas are supported, when RSs are transmitted from a certain antenna port, the RSs are transmitted at the locations of the REs specified according to the RS pattern and any signal is not transmitted at the locations of the REs specified for another antenna port.

The rule of mapping the CRSs to the RBs is defined by Equation 12.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6.$$

In Equation 12, k denotes a subcarrier index, l denotes a symbol index, and p denotes an antenna port index. $N_{symb}^{DL}$ denotes the number of OFDM symbols of one downlink slot, $N_{RB}^{DL}$ denotes the number of RBs allocated to the downlink, $n_s$ denotes a slot index, and $N_{ID}^{cell}$ denotes a cell ID. mod indicates a modulo operation. The location of the RS in the frequency domain depends on a value $V_{shift}$. Since the value $V_{shift}$ depends on the cell ID, the location of the RS has a frequency shift value which varies according to the cell.

More specifically, in order to increase channel estimation performance through the CRSs, the locations of the CRSs in the frequency domain may be shifted so as to be changed according to the cells. For example, if the RSs are located at an interval of three subcarriers, the RSs are arranged on 3k-th subcarriers in one cell and arranged on (3k+1)-th subcarriers in the other cell. In view of one antenna port, the RSs are arranged at an interval of 6 REs (that is, interval of 6 subcarriers) in the frequency domain and are separated from REs, on which RSs allocated to another antenna port are arranged, by 3 REs in the frequency domain.

In addition, power boosting is applied to the CRSs. The power boosting indicates that the RSs are transmitted using higher power by bringing (stealing) the powers of the REs except for the REs allocated for the RSs among the REs of one OFDM symbol.

In the time domain, the RSs are arranged from a symbol index (l=0) of each slot as a starting point at a constant interval. The time interval is differently defined according to the CP length. The RSs are located on symbol indexes 0 and 4 of the slot in case of the normal CP and are located on symbol indexes 0 and 3 of the slot in case of the extended CP. Only RSs for a maximum of two antenna ports are defined in one OFDM symbol. Accordingly, upon four-transmission antenna transmission, the RSs for the antenna ports 0 and 1 are located on the symbol indexes 0 and 4 (the symbol indexes 0 and 3 in case of the extended CP) of the slot and the RSs for the antenna ports 2 and 3 are located on the symbol index 1 of the slot. The frequency locations of the RSs for the antenna ports 2 and 3 in the frequency domain are exchanged with each other in a second slot.

In order to support spectrum efficiency higher than that of the existing 3GPP LTE (e.g., Release-8) system, a system (e.g., an LTE-A system) having the extended antenna configuration may be designed. The extended antenna configuration may have, for example, eight transmission antennas. In the system having the extended antenna configuration, UEs which operate in the existing antenna configuration needs to be supported, that is, backward compatibility needs to be supported. Accordingly, it is necessary to support a RS pattern according to the existing antenna configuration and to design a new RS pattern for an additional antenna configuration. If CRSs for the new antenna ports are added to the system having the existing antenna configuration, RS overhead is rapidly increased and thus data transfer rate is reduced. In consideration of these problems, in an LTE-A (Advanced) system which is an evolution version of the 3GPP LTE system, separate RSs (CSI-RSs) for measuring the CSI for the new antenna ports may be used.

Hereinafter, the DRS will be described in detail.

The DRS (or the UE-specific RS) is used to demodulate data. A precoding weight used for a specific UE upon multi-antenna transmission is also used in an RS without change so as to estimate an equivalent channel, in which a transfer channel and the precoding weight transmitted from each transmission antenna are combined, when the UE receives the RSs.

The existing 3GPP LTE system (e.g., Release-8) supports four-transmission antenna transmission as a maximum and the DRS for Rank 1 beamforming is defined. The DRS for Rank 1 beamforming is also denoted by the RS for the antenna port index 5. The rule of the DRS mapped on the RBs is defined by Equations 13 and 14. Equation 13 is for the normal CP and Equation 14 is for the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 13 and 14, k denotes a subcarrier index, l denotes a symbol index, and p denotes an antenna port index.

$N_{SC}^{RB}$ denotes the resource block size in the frequency domain and is expressed by the number of subcarriers. $n_{PRB}$ denotes a physical resource block number. $N_{RB}^{PDSCH}$ denotes the bandwidth of the RB of the PDSCH cell transmission. $n_s$ denotes a slot index, and $N_{ID}^{cell}$ denotes a cell ID. mod indicates a modulo operation. The location of the RS in the frequency domain depends on a value $V_{shift}$. Since the value $V_{shif}$ depends on the cell ID, the location of the RS has a frequency shift value which varies according to the cell.

In the LTE-A system which is the evolution version of the 3GPP LTE system, high-order MIMO, multi-cell transmission, evolved MU-MIMO or the like is considered. In order to support efficient RS management and a developed transmission scheme, DRS-based data demodulation is considered. That is, separately from the DRS (antenna port index 5) for Rank 1 beamforming defined in the existing 3GPP LTE (e.g., Release-8) system, DRSs for two or more layers may be defined in order to support data transmission through the added antenna.

Cooperative Multi-Point (CoMP)

According to the improved system performance requirements of the 3GPP LTE-A system, CoMP transmission/reception technology (may be referred to as co-MIMO, collaborative MIMO or network MIMO) is proposed. The CoMP technology can increase the performance of the UE located on a cell edge and increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the existing LTE system, a method of enabling the UE located on the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

Sounding RS (SRS)

An SRS is used for enabling an eNodeB to measure channel quality so as to perform frequency-selective scheduling on the uplink and is not associated with uplink data and/or control information transmission. However, the present invention is not limited thereto and the SRS may be used for improved power control or supporting of various start-up functions of UEs which are not recently scheduled. Examples of the start-up functions may include, for example, initial Modulation and Coding Scheme (MCS), initial power control for data transmission, timing advance, and frequency-semi-selective scheduling (scheduling for selectively allocating frequency resources in a first slot of a subframe and pseudo-randomly hopping to another frequency in a second slot).

In addition, the SRS may be used for downlink channel quality measurement on the assumption that the radio channel is reciprocal between the uplink and downlink. This assumption is particularly valid in a Time Division Duplex (TDD) system in which the same frequency band is shared between the uplink and the downlink and is divided in the time domain.

The subframe through which the SRS is transmitted by a certain UE within the cell is indicated by cell-specific broadcast signaling. 4-bit cell-specific "srsSubframeConfiguration" parameter indicates 15 possible configurations of the subframe through which the SRS can be transmitted within each radio frame. By such configurations, it is possible to provide adjustment flexibility of SRS overhead according to a network arrangement scenario. The remaining one (sixteenth) configuration of the parameters indicates the switch-off of the SRS transmission within the cell and is suitable for a serving cell for serving high-rate UEs.

As shown in FIG. 7, the SRS is always transmitted on a last SC-FDMA symbol of the configured subframe. Accordingly, the SRS and a Demodulation RS (DMRS) are located on different SC-FDMA symbols. PUSCH data transmission is not allowed on the SC-FDMA symbol specified for SRS transmission and thus sounding overhead does not approximately exceed 7% even when it is highest (that is, even when SRS transmission symbols are present in all subframes).

Each SRS symbol is generated by the basic sequence (random sequence or Zadoff-Ch (ZC)-based sequence set) with respect to a given time unit and frequency band, and all UEs within the cell use the same basic sequence. At this time, the SRS transmission of the plurality of UEs within the cell in the same time unit and the same frequency band is orthogonally distinguished by different cyclic shifts of the base sequence allocated to the plurality of UEs. The SRS sequences of different cells can be distinguished by allocating different basic sequences to respective cells, but the orthogonality between the different basic sequences is not guaranteed.

Relay Node (RN)

A RN may be considered for, for example, enlargement of high data rate coverage, improvement of group mobility, temporary network deployment, improvement of cell edge throughput and/or provision of network coverage to a new area.

A RN forwards data transmitted or received between the eNodeB and the UE, two different links (backhaul link and access link) are applied to the respective carrier frequency bands having different attributes. The eNodeB may include a donor cell. The RN is wirelessly connected to a radio access network through the donor cell.

The backhaul link between the eNodeB and the RN may be represented by a backhaul downlink if downlink frequency bands or downlink subframe resources are used, and may be represented by a backhaul uplink if uplink frequency bands or uplink subframe resources are used. Here, the frequency band is resource allocated in a Frequency Division Duplex (FDD) mode and the subframe is resource allocated in a Time Division Duplex (TDD) mode. Similarly, the access link between the RN and the UE(s) may be represented by an access downlink if downlink frequency bands or downlink subframe resources are used, and may be represented by an access uplink if uplink frequency bands or uplink subframe resources are used.

The eNodeB must have functions such as uplink reception and downlink transmission and the UE must have functions such as uplink transmission and downlink reception. The RN must have all functions such as backhaul uplink transmission to the eNodeB, access uplink reception from the UE, the backhaul downlink reception from the eNodeB and access downlink transmission to the UE.

In association with the use of the band (or the spectrum) of the RN, the case where the backhaul link operates in the same frequency band as the access link is referred to as "in-band" and the case where the backhaul link and the access link operate in different frequency bands is referred to as "out-band". In both the in-band case and the out-band case, a UE which operates according to the existing LTE system (e.g., Release-8), hereinafter, referred to as a legacy UE, must be able to be connected to the donor cell.

The RN may be classified into a transparent RN or a non-transparent RN depending on whether or not the UE recognizes the RN. The term "transparent" indicates that the UE cannot recognize whether communication with the network is performed through the RN and the term "non-transparent" indicates that the UE recognizes whether communication with the network is performed through the RN.

In association with the control of the RN, the RN may be classified into a RN configured as a part of the donor cell or a RN for controlling the cell.

The RN configured as the part of the donor cell may have a RN ID, but does not have its cell identity. When at least a part of Radio Resource Management (RRM) of the RN is controlled by the eNodeB to which the donor cell belongs (even when the remaining parts of the RRM are located on the RN), the RN is configured as the part of the donor cell. Preferably, such an RN can support a legacy UE. For example, examples of such an RN include various types of relays such as smart repeaters, decode-and-forward relays, L2 (second layer) relays and Type-2 relays.

In the RN for controlling the cell, the RN controls one or several cells, unique physical layer cell identities are provided to the cells controlled by the RN, and the same RRM mechanism may be used. From the viewpoint of the UE, there is no difference between access to the cell controlled by the RN and access to the cell controlled by a general eNodeB. Preferably, the cell controlled by such an RN may support a legacy UE. For example, examples of such an RN include self-backhauling relays, L3 (third layer) relays, Type-1 relays and Type-1a relays.

The Type-1 relay is an in-band relay for controlling a plurality of cells, which appears to be different from the donor cell, from the viewpoint of the UE. In addition, the plurality of cells has respective physical cell IDs (defined in the LTE Release-8) and the RN may transmit its synchronization channel, RSs, etc. In a single-cell operation, the UE may directly receive scheduling information and HARQ feedback from the RN and transmit its control channel (Scheduling Request (SR), CQI, ACK/NACK, etc.) to the RN. In addition, a legacy UE (a UE which operates according to the LTE Release-8 system) regards the Type-1 relay as a legacy eNodeB (an eNodeB which operates according to the LTE Release-8 system). That is, the Type-1 relay has backward compatibility. The UEs which operates according to the LTE-A system regard the Type-1 relay as an eNodeB different from the legacy eNodeB, thereby achieving performance improvement.

The Type-1a relay has the same characteristics as the above-described Type-1 relay except that it operates as an out-band relay. The Type-1a relay may be configured so as to minimize or eliminate an influence of the operation thereof on an L1 (first layer) operation.

The Type-2 relay is an in-band relay and does not have a separate physical cell ID. Thus, a new cell is not established. The Type-2 relay is transparent to the legacy UE and the legacy UE does not recognize the presence of the Type-2 relay. The Type-2 relay can transmit a PDSCH, but does not transmit at least a CRS and a PDCCH.

In order to enable the RN to operate as the in-band relay, some resources in a time-frequency space must be reserved for the backhaul link so as not to be used for the access link. This is called resource partitioning.

The general principle of the resource partitioning in the RN will now be described. The backhaul downlink and the access downlink may be multiplexed on one carrier frequency using a Time Division Multiplexing (TDM) scheme (that is, only one of the backhaul downlink or the access downlink is activated in a specific time). Similarly, the backhaul uplink and the access uplink may be multiplexed on one carrier frequency using the TDM scheme (that is, only one of the backhaul uplink or the access uplink is activated in a specific time).

The multiplexing of the backhaul link using a FDD scheme indicates that backhaul downlink transmission is performed in a downlink frequency band and the backhaul uplink transmission is performed in an uplink frequency band. The multiplexing of the backhaul link using the TDD scheme indicates that the backhaul downlink transmission is performed in a downlink subframe of the eNodeB and the RN and the backhaul uplink transmission is performed in an uplink subframe of the eNodeB and the RN.

In the in-band relay, for example, if the backhaul downlink reception from the eNodeB and the access downlink transmission to the UE are simultaneously performed in a predetermined frequency band, the signal transmitted from the transmitter of the RN may be received by the receiver of the RN and thus signal interference or RF jamming may occur in the RF front end of the RN. Similarly, if the access uplink reception from the UE and the backhaul uplink transmission to the eNodeB are simultaneously performed in a predetermined frequency band, signal interference may occur in the RF front end of the RN. Accordingly, it is difficult to implement the simultaneous transmission and reception in one frequency band at the RN unless the received signal and the transmitted signal are sufficiently separated (for example, unless the transmission antennas and the reception antennas are sufficiently separated form each other (for example, on the ground or under the ground) in terms of geographical positions).

Figure 8:
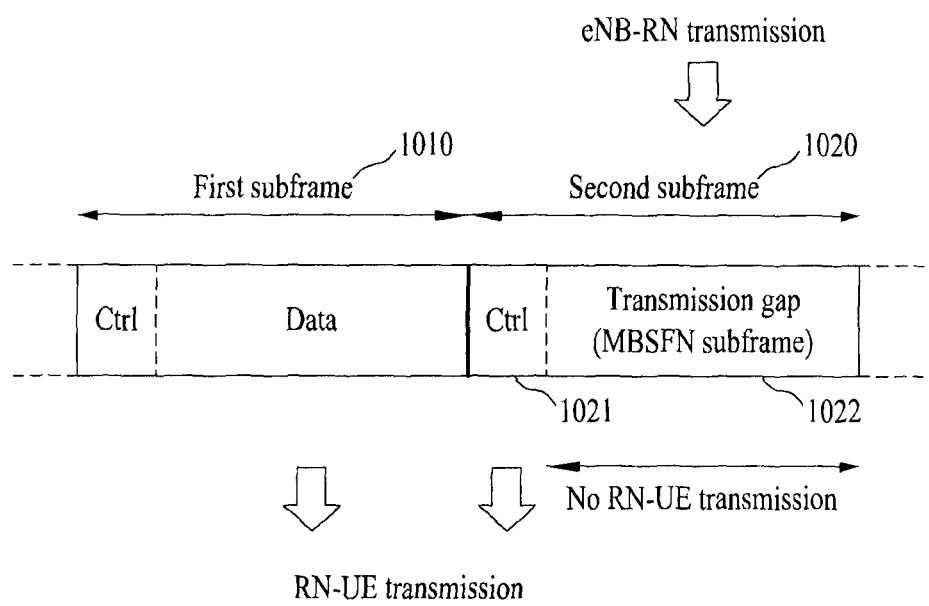
FIG. 8 shows resource partitioning for a relay node (RN)

As a method for solving the signal interference, the RN operates so as not to transmit a signal to the UE while a signal is received from the donor cell. That is, a gap may be generated in the transmission from the RN to the UE and any transmission from the RN to the UE (including the legacy UE) may not be performed. Such a gap may be set by configuring a Multicast Broadcast Single Frequency Network (MBSFN) subframe (see FIG. 8). In FIG. 8, a first subframe 1010 is a general subframe, in which a downlink (that is, access downlink) control signal and data is transmitted from the RN to the UE, and a second subframe 1020 is an MBSFN subframe, in which a control signal is transmitted from the RN to the UE in a control region 1021 of the downlink subframe, but any signal is not transmitted from the RN to the UE in the remaining region 1022 of the downlink subframe. Since the legacy UE expects the transmission of the PDCCH in all downlink subframes (that is, the RN needs to enable the legacy UEs within its own area to receive the PDCCH in every subframe so as to perform a measurement function), for the correct operation of the legacy UEs, it is necessary to transmit the PDCCH in all the downlink subframes. Accordingly, even on the subframe (the second subframe 1020)) set for the transmission of the downlink (that is, the backhaul downlink) from the eNodeB to the RN, the RN needs to transmit the access downlink in first N (N=1, 2 or 3) OFDM symbol intervals of the subframe, without receiving the backhaul downlink. Since the PDCCH is transmitted from the RN to the UE in the control region 1021 of the second subframe, it is possible to provide backward compatibility to the legacy UE served by the RN. While any signal is not transmitted from the RN to the UE in the remaining region 1022 of the second subframe, the RN may receive the signal transmitted from the eNodeB. Accordingly, the resource partitioning disables the in-band RN to simultaneously perform the access downlink transmission and the backhaul downlink reception.

The second subframe 1022 using the MBSFN subframe will now be described in detail. The MBSFN subframe is essentially used for a Multimedia Broadcast and Multicast Service (MBMS) which simultaneously transmits the same signal in the same cell. The control region 1021 of the second subframe may be a RN non-hearing interval. The RN non-hearing interval refers to an interval in which the RN does not receive a backhaul downlink signal and transmits an access downlink signal. This interval may be set to 1, 2 or 3 OFDM lengths as described above. The RN performs the access downlink transmission to the UE in the RN non-hearing interval 1021 and performs the backhaul downlink reception from the eNodeB in the remaining region 1022. At this time, since the RN cannot simultaneously perform the transmission and reception in the same frequency band, it takes a certain length of time to switch the RN from the transmission mode to the reception mode. Accordingly, it is necessary to set a guard time (GT) to switch the RN from the transmission mode to the reception mode in a first portion of the backhaul downlink reception region 1022. Similarly, even when the RN receives the backhaul downlink from the eNodeB and transmits the access downlink to the UE, a guard time (GT) to switch the RN from the reception mode to the transmission mode may be set. The length of the guard time may be set to values of the time domain, for example, values of k (k≥1) time samples Ts or one or more OFDM symbol lengths. Alternatively, if the backhaul downlink subframes of the RN are consecutively set or according to a predetermined subframe timing alignment relationship, the guard time of a last portion of the subframes may not be defined or set. Such a guard time may be defined only in the frequency domain set for the transmission of the backhaul downlink subframe, in order to maintain backward compatibility (the legacy UE cannot be supported if the guard time is set in the access downlink interval). The RN can receive a PDCCH and a PDSCH from the eNodeB in the backhaul downlink reception interval 1022 except for the guard time. Specifically, PDCCH for RN may be represented by a R-PDCCH (Relay-PDCCH) to signify a physical channel dedicated for RN.

PUCCH (Physical Uplink Control CHannel)

Uplink control information (DCI) transmitted over a PUCCH may include a scheduling request (SR), HARQ ACK/NACK information, and downlink channel measurement information.

HARQ ACK/NACK information may be generated according to success or failure of a downlink data packet on a PDSCH.

In a conventional wireless communication system, 1 bit is transmitted as ACK/NACK information in case of downlink transmission of a single codeword, and 2 bits are transmitted as ACK/NACK information in case of downlink transmission of two codewords.

Channel measurement information indicates feedback information related to a Multiple Input Multiple Output (MIMO) scheme, and may include a channel quality indicator (CQI), a precoding matrix index (PMI) and a rank indicator (RI). The above-mentioned channel measurement information may also be referred to as CQI. For CQI transmission, 20 bits per subframe may be used.

PUCCH may be modulated using Binary Phase Shift Keying (BPSK) and Quadrature Phase Shift Keying (QPSK) schemes. A plurality of UE control information pieces may be transmitted through a PUCCH. When Code Division Multiplexing (CDM) is performed in order to discriminate signals of UEs, a Constant Amplitude Zero Autocorrelation (CAZAC) sequence having a length of 12 is mainly used. Since the CAZAC sequence has a property that a constant amplitude is maintained in a time domain and a frequency domain, a Peak-to-Average Power Ratio (PAPR) of a UE or Cubic Metric (CM) may be decreased to increase coverage. In addition, ACK/NACK information for DL data transmitted through the PUCCH may be covered using an orthogonal sequence.

In addition, control information transmitted through the PUCCH may be discriminated using cyclically shifted sequences having different cyclic shift values. A cyclically shifted sequence may be generated by cyclically shifting a basic sequence (also called a base sequence) by a specific cyclic shift (CS) amount. The specific CS amount is indicated by a CS index. The number of available CSs may be changed according to channel delay spread. Various sequences may be used as the basic sequence and examples thereof include the above-described CAZAC sequence.

The amount of control information which a UE can transmit in a single subframe may depend on the number of SC-FDMA symbols available for transmission of control information. The SC-FDMA symbols available for transmission of control information correspond to SC-FDMA symbols excluding SC-FDMA symbols used for transmission of a reference signal that detects coherency of the PUCCH.

PUCCH for use in the 3GPP LTE system is defined as a total of 7 different formats according to transmission control information, a modulation scheme, the amount of control information, etc. Uplink Control Information (UCI) transmitted according to individual PUCCH formats can be summarized as shown in the following Table 1.

TABLE 1

| PUCCH format | Modulation scheme | Number of bits per subframe | Usage | etc. |
|---|---|---|---|---|
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | OPSK + BPSK | 21 | CQI + ACK/NACK | Normal CP only |
| 2b | QPSK + BPSK | 22 | CQI + ACK/NACK | Normal CP only |

PUCCH format 1 may be used for SR-only transmission. Non-modulated waveforms may be applied to the SR-only transmission, and a detailed description thereof will hereinafter be described in detail.

PUCCH format 1a or 1b may be used for HARQ ACK/NACK transmission. If HARQ ACK/NACK is transmitted alone in an arbitrary subframe, PUCCH format 1a or 1b may be used. Otherwise, HARQ ACK/NACK and SR may be transmitted through the same subframe using PUCCH format 1a or 1b.

PUCCH format 2 may be used for CQI transmission, and PUCCH format 2a or 2b may be used for transmission of CQI and HARQ ACK/NACK. In the case of the extended CP, PUCCH format 2 may be used for transmission of CQI and HARQ ACK/NACK.

Figure 9:
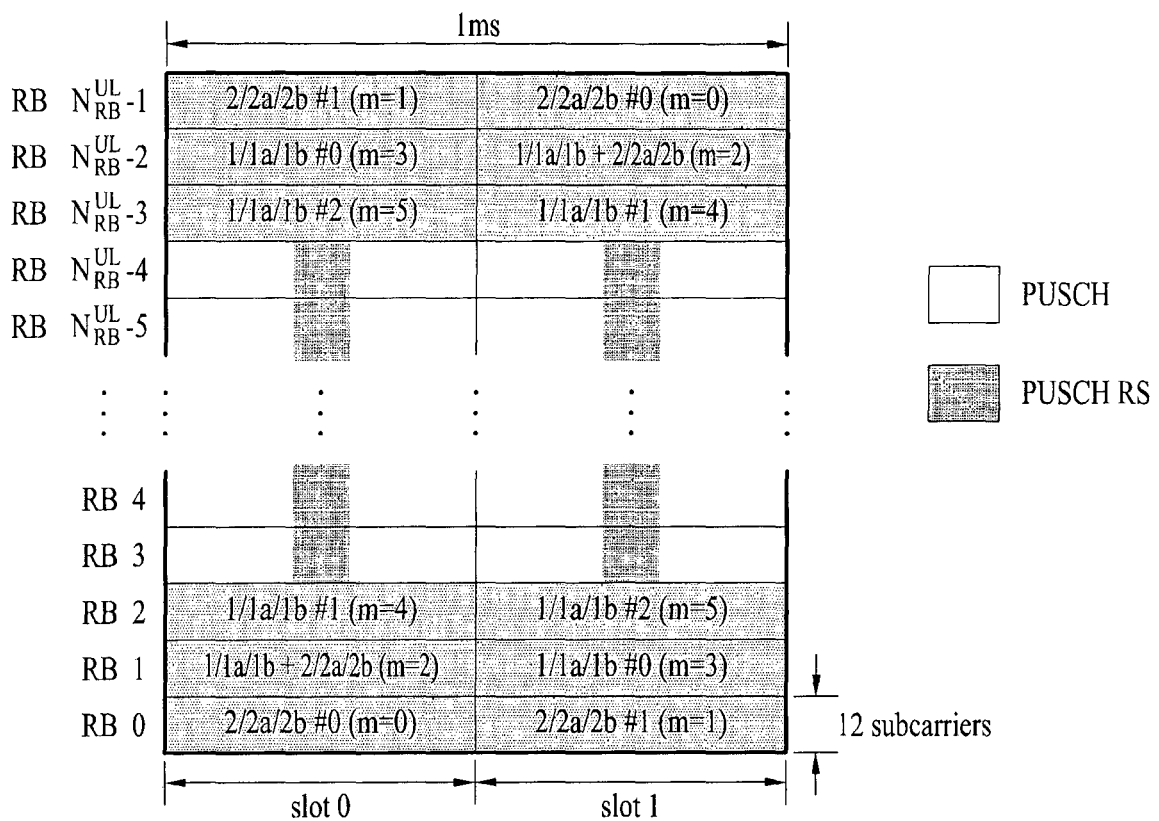
FIG. 9 shows mapping of PUCCH formats for use in an uplink physical resource block.

FIG. 9 shows mapping of PUCCH formats for use in an uplink physical resource block. In FIG. 9, $N_{RB}^{UL}$ is the number of resource blocks (RBs) for use in uplink (UL), and 0, 1, ..., $N_{RB}^{UL}$ is a physical resource block (PRB) number. Basically, PUCCH may be mapped to both edges of an uplink frequency block. As can be seen from FIG. 9, PUCCH format 2/2a/2b may be mapped to a PUCCH region denoted by m=0,1, and PUCCH format 2/2a/2b may be mapped to resource blocks (RBs) located at a band-edge part. In addition, PUCCH format 2/2a/2b and PUCCH format 1/1a/1b may be mixedly mapped to a PUCCH region denoted by m=2. Next, PUCCH format 1/1a/1b may be mapped to a PUCCH region denoted by m=3,4,5. The number $N_{RB}^{(2)}$ of available PUCCH RBs by PUCCH format 2/2a/2b may be signaled to UEs contained in a cell through broadcast signaling.

PUCCH Resources

A user equipment (UE) may receive PUCCH resources for UCI transmission from a base station (BS) using the explicit or implicit scheme through higher layer signaling.

In case of ACK/NACK, multiple PUCCH resource candidates may be assigned to a UE by a higher layer. In this case, information as to which PUCCH resource is used may be implicitly determined. For example, the UE receives a PDSCH from the BS, and may transmit ACK/NACK of the corresponding data unit through PUCCH resources implicitly determined by PUCCH resources carrying PDSCH scheduling information.

Figure 10:
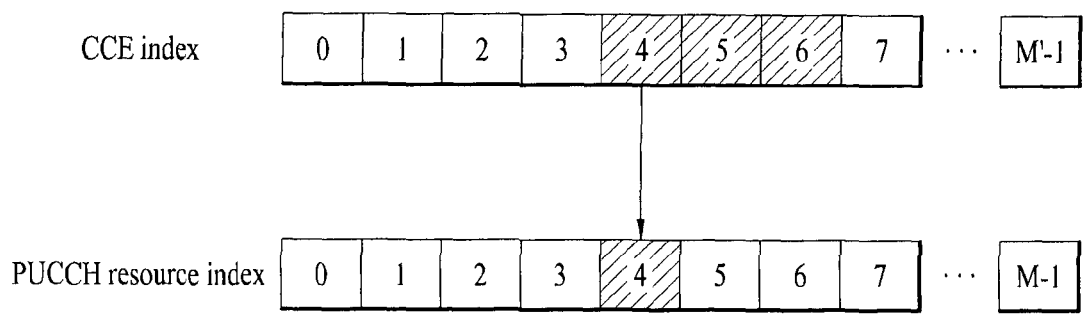
FIG. 10 shows an example for deciding PUCCH resources for ACK/NACK.

FIG. 10 shows an example for deciding PUCCH resources for ACK/NACK.

In the LTE system, PUCCH resources for the ACK/NACK are not pre-allocated to each UE, and several UEs located in the cell are configured to divisionally use several PUCCH resources at every time point. In more detail, PUCCH resources used for ACK/NACK transmission of a UE are implicitly determined on the basis of a PDCCH that carries scheduling information of a PDSCH carrying the corresponding DL data. The entire region to which a PDCCH is transmitted in each DL subframe is comprised of a plurality of Control Channel Elements (CCEs), and a PDCCH transmitted to the UE is comprised of one or more CCEs. Each CCE includes a plurality of Resource Element Groups (REGs) (e.g., 9 REGs). One REQ may includes neighbor or contiguous REs under the condition that a reference signal (RS) is excluded. The UE may transmit ACK/NACK through implicit PUCCH resources that are derived or calculated by a function of a specific CCE index (e.g., first or lowest CCE index) from among CCEs constructing a PDCCH received by the UE.

Referring to FIG. 10, each PUCCH resource index may correspond to PUCCH resources for ACK/NACK. As can be seen from FIG. 10, if it is assumed that PDSCH scheduling information is transmitted to the UE through a PDCCH composed of 4-6-indexed CCEs (i.e., NOs. 4, 5, 6 CCEs), the UE transmits ACK/NACK to the BS through the 4-indexed PUCCH corresponding to a CCE having the lowest index (i.e., No. 4 CCE) constructing the PDCCH. For example, ACK/NACK is transmitted to the BS through the 4-indexed PUCCH. FIG. 10 shows the example in which a maximum of M' CCEs is present in a DL and a maximum of M PUCCHs is present in a UL. Although M' may be identical to M (M'=M), may be different from M as necessary, and CCE resource mapping may overlap with PUCCH resource mapping as necessary.

For example, PUCCH resource index may be defined as shown in the following Equation 15.

$$n_{PUCCH}^{(1)} = n_{CCE} + N_{PUCCH}^{(1)} \quad \text{[Equation 15]}$$

In Equation 15, $n^{(1)}_{PUCCH}$ is a PUCCH resource index for ACK/NACK transmission, $N^{(1)}_{PUCCH}$ is a signaling value received from a higher layer, and $n_{CCE}$ may be the smallest value from among CCE indexes used for PDCCH transmission.

PUCCH Channel Structure

PUCCH format 1a/1b will hereinafter be described in detail.

In PUCCH format 1a/1b, a symbol modulated using the BPSK or QPSK modulation scheme is multiplied by a CAZAC sequence of length 12. For example, the multiplication result between the modulation symbol d(0) and the CAZAC sequence r(n) (where, n=0, 1, 2, ..., N−1) having the length of N is denoted by y(0), y(1), y(2), ..., y(N−1). In this case, y(0), ..., y(N−1) symbols may be referred to as 'block of symbol'. After multiplying the CAZAC sequence by a modulation symbol, the resultant symbol is blockwise-spread using an orthogonal sequence.

A Hadamard sequence of length 4 is applied to general ACK/NACK information, and a DFT (Discrete Fourier Transform) sequence of length 3 is applied to the shortened ACK/NACK information and a reference signal. A Hadamard sequence of length 2 may be applied to the reference signal for the extended CP.

Figure 11:
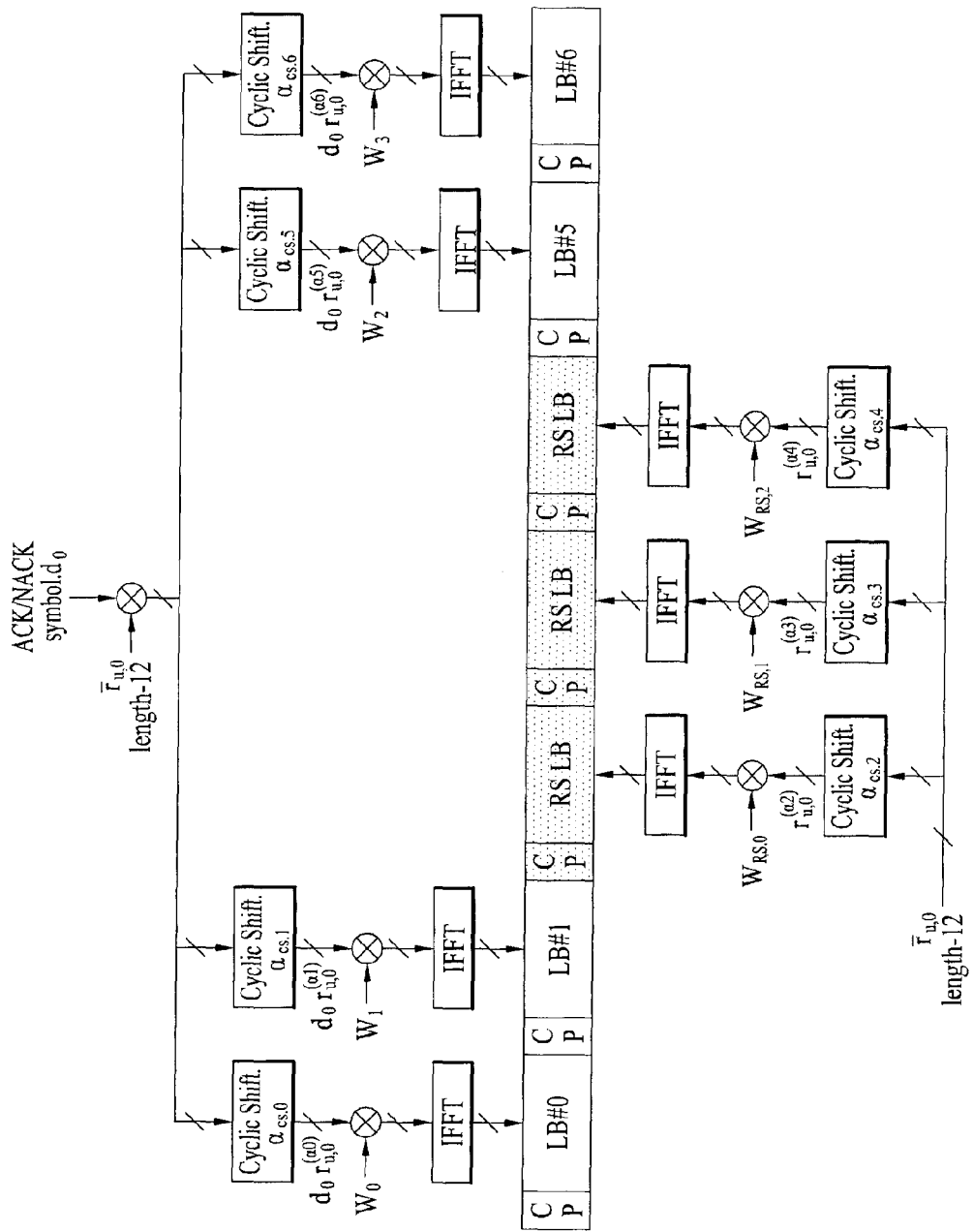
FIG. 11 shows an ACK/NACK channel structure for use in a normal CP.

FIG. 11 shows an ACK/NACK channel structure for use in a normal CP. In more detail, FIG. 11 shows an example of a PUCCH channel structure for transmitting HARQ ACK/NACK other than a CQI. One slot includes seven SC-FDMA symbols. RSs are carried on three consecutive SC-FDMA symbols located at the intermediate portion of the slot and an ACK/NACK signal is carried on four remaining SC-FDMA symbols. In case of the extended CP, RSs may be carried on two consecutive symbols located at the intermediate portion of the slot. The number and location of symbols used for RS may be changed according to a control channel, and the number and location of symbols used for associated ACK/NACK signals may also be changed according to the control channel.

ACK/NACK information (unscrambled status) of one or two bits may be represented by one HARQ ACK/NACK modulation symbol using the BPSK or QPSK modulation scheme. The ACK signal may be encoded into '1', and the NACK signal may be encoded into '0'.

In order to increase multiplexing capacity when transmitting a control signal within an allocated band, two-dimensional (2D) spreading is used. In other words, frequency domain spreading and time domain spreading are simultaneously used to increase the number of UEs capable of being multiplexed or the number of control channels. In order to spread the ACK/NACK signal in a frequency domain, a frequency domain sequence is used as a basic sequence. A Zadoff-Chu (ZC) sequence from among CAZAC sequences may be used as a frequency domain sequence. For example, different cyclic shifts (CSs) are applied to the ZC sequence acting as a basic sequence, such that different UEs or different control channels can be multiplexed. The number of CS resources supported by the SC-FDMA symbol for PUCCH RBs for HARQ ACK/NACK transmission is established by a cell-specific higher-layer signaling parameter $\Delta_{shift}^{PUCCH}$. In this case, $\Delta_{shift}^{PUCCH} \in \{1, 2, 3\}$ indicates 12, 6, or 4 shifts.

The ACK/NACK signal spread in a frequency domain is spread in a time domain using an orthogonal spreading code. Walsh-hadamard sequence or DFT sequence may be used as an orthogonal spread code. For example, the ACK/NACK signal may be spread by applying orthogonal sequences (w0, w1, w2, w3) each having the length of 4 to four symbols. In addition, RS may be spread using an orthogonal sequence of the length 3 or 2. The above-mentioned operation is called an orthogonal covering (OC).

Bu means of CS resources of a frequency domain and OC resources of a time domain, multiple UEs can be multiplexed using the Code Division Multiplexing (CDM) scheme. That is, ACK/NACK information and RS of many UEs can be multiplexed on the same PUCCH RB.

In association with the above-mentioned time domain spreading CDM, the number of spread codes supported for ACK/NACK information is limited by the number of RS symbols. That is, the number of SC-FDAM symbols for RS transmission is less than the number of SC-FDMA symbols for ACK/NACK transmission, such that multiplexing capacity of the RS is smaller than that of the ACK/NACK information. For example, in the case of a normal CP, ACK/NACK information can be transmitted through four symbols. For ACK/NACK information, three orthogonal spread codes but not four orthogonal spread codes may be used because the number of RS transmission symbols is limited to 3 so that only three orthogonal spread codes can be used for RS.

Examples of a sequence used to spread the ACK/NACK information are shown in Tables 2 and 3. Table 2 shows a sequence having 4 symbols and Table 3 shows a sequence having 3 symbols. The sequence having 4 symbols is used in the PUCCH format 1/1a/1b of a general subframe configuration. In the subframe configuration, in consideration of the case where a Sounding Reference Signal (SRS) is transmitted at a last symbol of a second slot, a sequence having 4 symbols is applied to the first slot and the shortened PUCCH format 1/1a/1b of a sequence having 3 symbols may be applied to the second slot.

TABLE 2

| Sequence index | [w(0), w(1), w(2), w(3)] |
|---|---|
| 0 | [+1 +1 +1 +1] |
| 1 | [+1 −1 +1 −1] |
| 2 | [+1 −1 −1 +1] |

TABLE 3

| Sequence index | [w(0), w(1), w(2)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

An example of orthogonal sequences used to spread the reference signal (RS) of the ACK/NACK channel is shown in Table 4.

TABLE 4

| Sequence index | Normal CP | Extended CP |
|---|---|---|
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

In a subframe of a normal CP, provided that three symbols of a single slot are used for RS transmission and four symbols are used for ACK/NACK transmission, for example, provided that six cyclic shifts (CSs) are used in a frequency domain and three OC resources are used in a time domain, HARQ ACK/NACK signals from a total of 18 different UEs can be multiplexed in one PUCCH RB. In a subframe of the extended CP, provided that two symbols of one slot are used for RS transmission and four symbols are used for ACK/NACK transmission, for example, provided that six CSs are used in a frequency domain and two OC resources are used in a time domain, HARQ ACK/NACK signals from a total of 12 different UEs can be multiplexed in one PUCCH RB.

Next, PUCCH format 1 will hereinafter be described. The SR is transmitted such that a UE requests or does not request scheduling. The SR channel reuses an ACK/NACK channel structure of the PUCCH format 1a/1b and employs On-Off Keying (OOK) based on ACK/NACK channel design. No reference signal (RS) is transmitted over an SR channel. Therefore, in the case of a normal CP, a sequence of the length 7 is used. In the case of an extended CP, a sequence of the length 6 is used. Different CSs or different orthogonal covers (OCs) may be assigned to each of SR and ACK/NACK. That is, for positive SR transmission, the UE transmits HARQ ACK/NACK through resources allocated for SR. For negative SR transmission, the UE transmits HARQ ACK/NACK through resources allocated for ACK/NACK.

Next, PUCCH format 2/2a/2b will hereinafter be described. PUCCH format 2/2a/2b is a control channel for transmitting channel measurement feedback (CQI, PMI, RI).

A report period of channel measurement feedback (hereinafter referred to as CQI) and a frequency unit (or a frequency resolution) to be measured can be controlled by a base station (BS). Periodic or aperiodic CQI report may be supported in a time domain. PUCCH format 2 may be used only for periodic reporting, and PUSCH may be used for aperiodic reporting. In case of the aperiodic reporting, a BS may command a UE to carry each CQI report on a resource scheduled for uplink data transmission.

Figure 12:
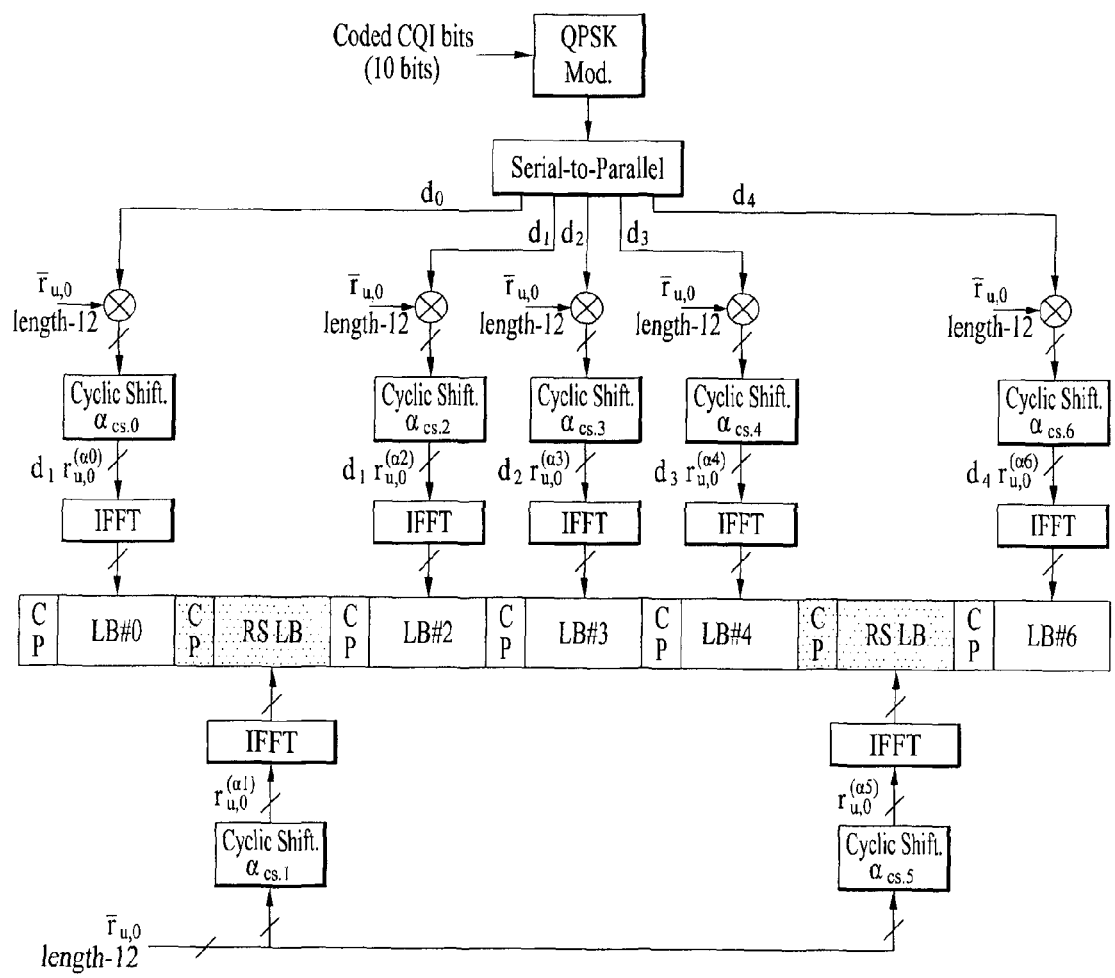
FIG. 12 shows a CQI channel structure for use in a normal CP.

FIG. 12 shows a CQI channel for use in a normal CP. From among SC-FDMA symbols 0 to 6 of one slot, SC-FDMA symbols 1 and 5 (i.e., second and sixth symbols) may be used for DMS (Demodulation Reference Signal) transmission, and CQI information may be transmitted in the remaining SC-FDMA symbols. On the other hand, in the case of the extended CP, one SC-FDMA symbol (SC-FDMA symbol 3) may be used for DMRS transmission.

In PUCCH format 2/2a/2b, modulation based on a CAZAC sequence is supported, and a QPSK modulated symbol is multiplied by the CAZAC sequence of the length 12. CS of the sequence is changed between symbols or slots. Orthogonal covering (OC) is used for DMRS.

DMRS may be loaded on two SC-FDMA symbols spaced apart from each other by a predetermined distance corresponding to 3 SC-FDMA symbol intervals from among 7 SC-FDMA symbols contained in one slot, and CQI information may be loaded on the remaining 5 SC-FDMA symbols. The reason why two RSs may be used in one slot is to support a high-speed UE. In addition, each UE may be discriminated by a sequence. CQI symbols may be modulated in the entire SC-FDMA symbol, and the modulated CQI symbols may then be transmitted. The SC-FDMA symbol is composed of one sequence. That is, a UE performs CQI modulation using each sequence, and transmits the modulated result.

The number of symbols that can be transmitted to one TTI is set to 10, and CQI modulation is extended up to QPSK. If QPSK mapping is applied to the SC-FDMA symbol, a CQI value of 2 bits may be loaded on the SC-FDMA symbol, so that a CQI value of 10 bits may be assigned to one slot. Therefore, a maximum of 20-bit CQI value may be assigned to one subframe. A frequency domain spreading code may be used to spread CQI in a frequency domain.

CAZAC sequence (for example, a ZC sequence) of the length 12 may be used as a frequency domain spread code. CAZAC sequences having different cyclic shift (CS) values may be applied to individual control channels, such that the control channels may be distinguished from one another. IFFT may be applied to the frequency domain spread CQI.

12 different UEs can be orthogonally multiplexed on the same PUCCH RB by CS having 12 equal intervals. In the case of a normal CP, although a DMRS sequence for SC-FDMA symbols 1 and 5 (in case of the extended CP, a DMRS sequence for SC-FDMA symbol 3) is similar to a CQI signal sequence of a frequency domain, modulation such as CQI is not applied to the DMRS sequence. The UE may be semi-statically established by higher layer signaling in such a manner that different CQI, PMI and RI types are periodically reported over PUCCH resources indicated by PUCCH resource index $n_{PUCCH}^{(2)}$. In this case, PUCCH resource index $n_{PUCCH}^{(2)}$ indicates a PUCCH region used for PUCCH format 2/2a/2b transmission and a CS value to be used for PUCCH format 2/2a/2b transmission.

The enhanced-PUCCH (e-PUCCH) format will hereinafter be described in detail. The e-PUCCH format may correspond to PUCCH format 3 of the LTE-A system. The block spreading scheme may be applied to ACK/NACK transmission using PUCCH format 3.

Figure 13:
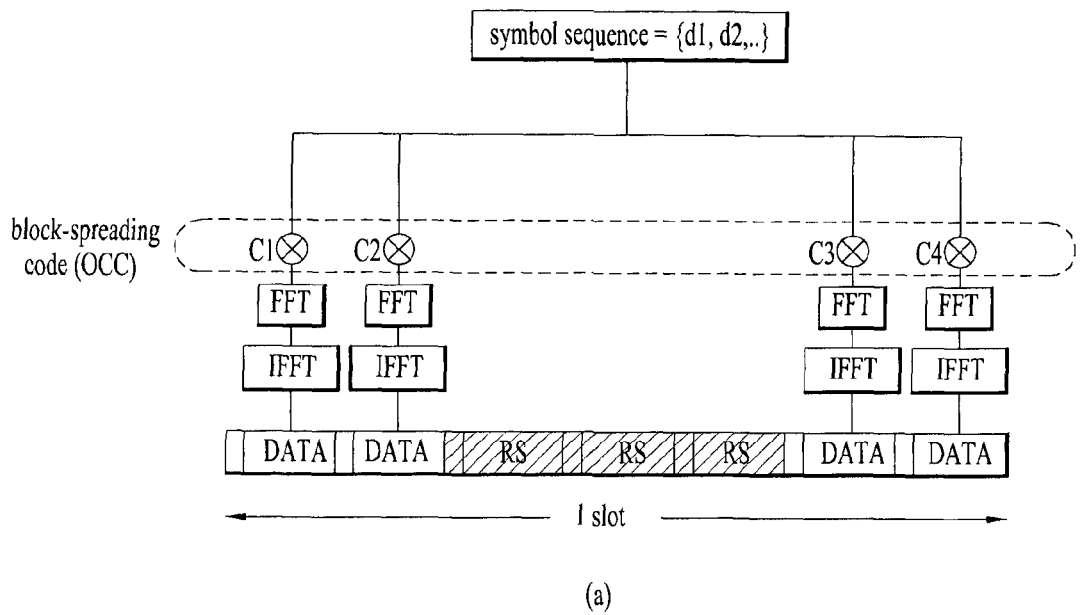
FIG. 13 shows a PUCCH channel structure using block spreading.
Figure 13:
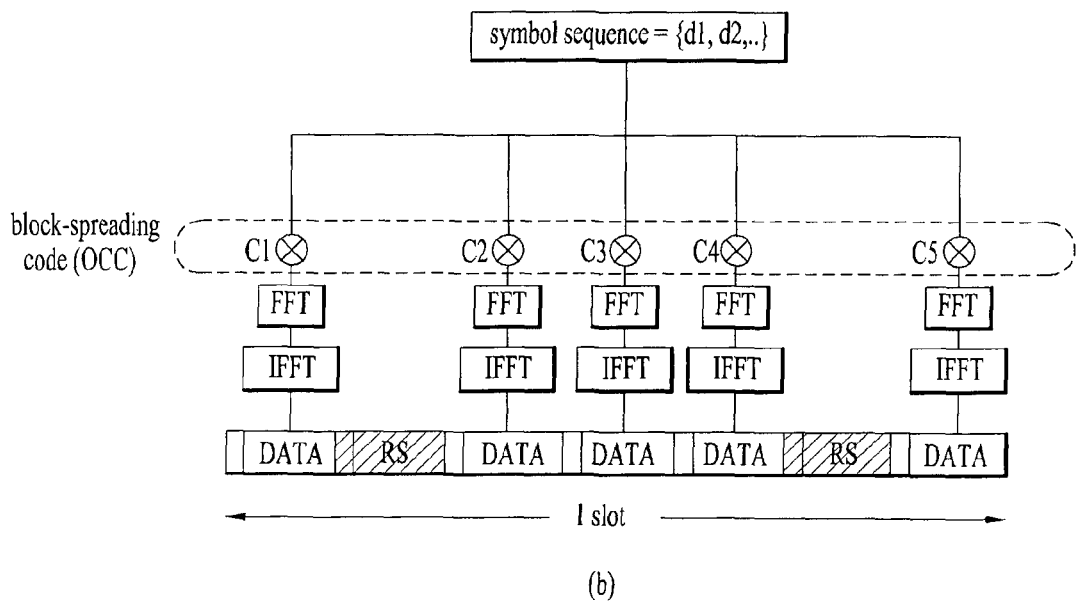

The block spreading scheme is designed to modulate transmission of a control signal using the SC-FDMA scheme, differently from the legacy PUCCH format 1 or 2 series. Referring to FIG. 13, a symbol sequence may be spread and transmitted on a time domain using an orthogonal cover code (OCC). By means of the OCC, control signals of multiple UEs can be multiplexed on the same RB. In case of PUCCH format 2, one symbol sequence is transmitted across a time domain, and control signals of multiple UEs are multiplexed using a Cyclic Shift (CS) of the CAZAC. In case of the block spreading PUCCH format (for example, PUCCH format 3), one symbol sequence is transmitted over a frequency domain, and control signals of several UEs are multiplexed using OCC-based time domain spreading.

FIG. 13(a) shows an example for generating/transmitting four SC-FDMA symbols (i.e., a data part) using an OCC of a spreading factor (SF)=4 in one symbol sequence during one slot. In this case, three RS symbols (i.e., RS part) may be used for one slot.

FIG. 13(b) shows an example for generating/transmitting 5 SC-FDMA symbols (i.e., a data part) using an OCC of SF=5 in a single symbol sequence during one slot. In this case, two RS symbols may be utilized during one slot.

As can be seen from FIG. 13, RS symbols may be generated from the CAZAC sequence to which a specific CS value is applied, and a predetermined OCC may be applied to (or multiplied by) several RS symbols, such that the resultant symbols can be transmitted. In addition, if it is assumed that 12 modulation symbols are used for each OFDM symbol (or each SC-FDMA symbol) and each modulation symbol is generated by QPSK as shown in FIG. 13, a maximum number of bits capable of being transmitted in one slot is denoted by 12 bits (=12×2). Therefore, a total number of bits capable of being transmitted through two slots is 48. In case of using a PUCCH channel structure based on the block spreading scheme, it is possible to transmit much more control information than the conventional PUCCH format 1 or 2 series.

Carrier Aggregation

Figure 14:
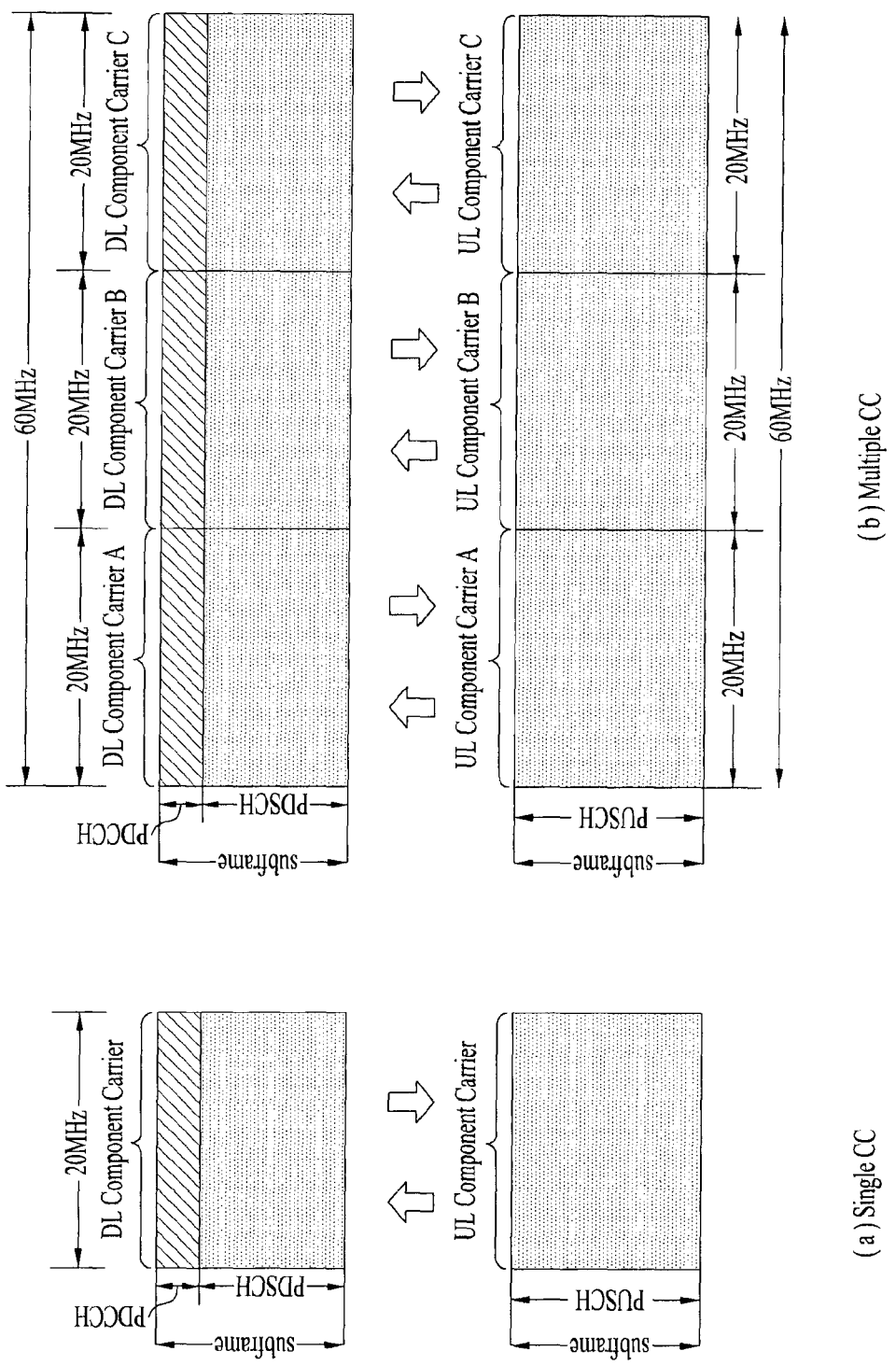
FIG. 14 is a conceptual diagram illustrating a carrier aggregation.

FIG. 14 is a conceptual diagram illustrating a carrier aggregation. Prior to describing the carrier aggregation, a cell used for managing radio resources by LTE-A will hereinafter be described in detail. The cell may be understood to be a combination of DL resources and UL resources. In this case, UL resources are not mandatory, and therefore the cell may be composed of DL resources only, or may also be composed of DL resources and UL resources. The above-mentioned description is defined in the current LTE-A Release 10. If necessary, the cell may also be composed of UL resources only. DL resources may be referred to as a downlink component carrier (DL CC), and UL resources may be referred to as an uplink component carrier (UL CC). DL CC or UL CC may be represented by a carrier frequency, and the carrier frequency indicates a center frequency for use in the corresponding cell.

Cells may be classified into a primary cell (PCell) operating at a primary frequency and a secondary cell (SCell) operating at a secondary frequency. PCell and SCell may be generically named a serving cell. PCell may be set to either a cell indicated when a UE performs initial connection establishment or a cell indicated in a connection reconfiguration process or handover process. That is, PCell may be understood to be a cell serving as the control-related center in a carrier aggregation environment to be described later. The UE receives PUCCH from its own PCell, and transmits the received PUCCH. SCell may be constructed after RRC (Radio Resource Control) connection establishment, and may be used for providing additional radio resources. The remaining serving cells other than PCell may be considered to be SCell in the carrier aggregation environment. Provided that no carrier aggregation is established in the UE of an RRC CONNECTED status or the UE does not support a carrier aggregation, there is only one serving cell composed of only PCell. In contrast, if carrier aggregation is established in the UE of an RRC CONNECTED status, there is at least one serving cell, and PCell and all SCells are included in the entire serving cell. For a UE supporting carrier aggregation, after starting an initial security activation process, one or more SCells can be configured in addition to PCell initially configured in the connection establishment process.

The carrier aggregation will hereinafter be described with reference to FIG. 14. Carrier aggregation has been introduced to utilize a wider band for satisfying high-speed transfer rate. Carrier aggregation is defined as an aggregation (or aggregate) of two or more component carriers (CCs) having different carrier frequencies. FIG. 14(a) shows a subframe in case that one CC is utilized in the legacy LTE system, and FIG. 14(b) shows a subframe in case that carrier aggregation is utilized. FIG. 14(b) exemplarily shows that three 20 MHz CCs are used to support a total of 60 MHz bandwidth. In this case, individual CCs are contiguous or non-contiguous to each other.

The UE can simultaneously receive and monitor DL data through several DL CCs. A linkage between each DL CC and each UL CC may be indicated by system information. DL CC/UL CC link may be fixed in the system or semi-statically configured in the system. In addition, although the entire system bandwidth is composed of N CCs, a frequency band capable of being monitored/received by a specific UE may be limited to M CCs. (where M<N). Various parameters for carrier aggregation may be cell-specifically, UE group-specifically, or UE-specifically established.

Figure 15:
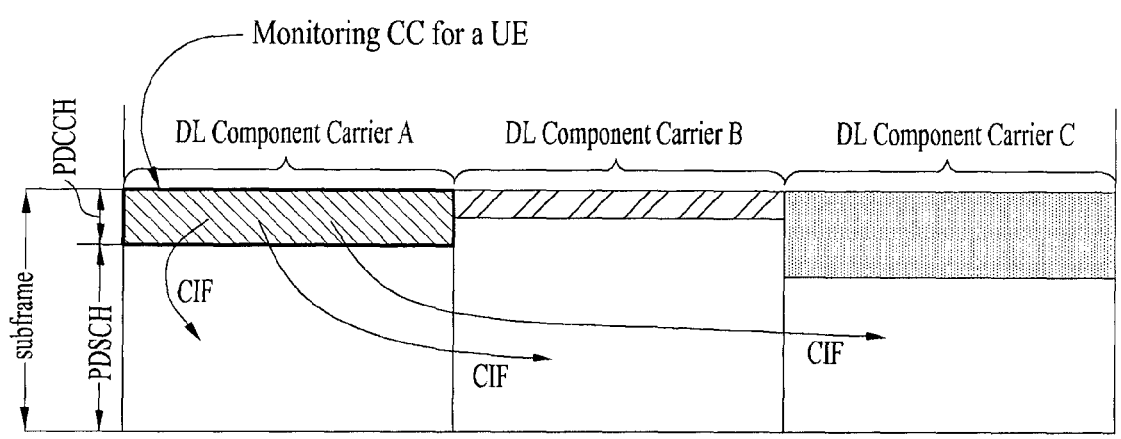
FIG. 15 is a conceptual diagram illustrating cross-carrier scheduling.

FIG. 15 is a conceptual diagram illustrating cross-carrier scheduling. For example, cross-carrier scheduling indicates that downlink scheduling allocation information of different DL CCs is contained in a control region of any one of the serving cells, or indicates that uplink scheduling acknowledgement (ACK) information of several UL CCs linked to the corresponding DL CC is contained in a control region of any one DL CC selected from among several serving cells.

First, a carrier indicator field (CIF) will hereinafter be described in detail.

CIF may be contained or not contained in a DCI format transmitted over a PDCCH. If CIF is contained in the DCI format, the resultant CIF indicates that the cross-carrier scheduling is applied. If the cross-carrier scheduling is not applied, downlink scheduling allocation information is considered to be valid in a DL CC via which current DL scheduling assignment information is transmitted. In addition, uplink scheduling acknowledgement is considered to be valid in one UL CC linked to a DL CC via which downlink scheduling allocation information is transmitted.

If the cross-carrier scheduling is applied, CIF indicates a CC related to downlink scheduling allocation information transmitted over a PDCCH in any one of DL CCs. For example, as can be seen from FIG. 15, downlink allocation information (i.e., information regarding PDSCH resources) for DL CC B and DL CC C is transmitted through a PDCCH contained in a control region of DL CC A. The UE monitors DL CC A, such that it can recognize a resource region of a PDSCH and the corresponding CC through a CIF.

Information as to whether CIF is contained in a PDCCH or not may be semi-statically established, or may be UE-specifically activated by higher layer signaling.

If CIF is disabled, PDSCH resources of the same DL CC may be assigned to a PDCCH of a specific DL CC, and PUSCH resources of a UL CC linked to a specific DL CC may be assigned. In this case, the same coding scheme, the same CCE based resource mapping, and the same DCI format as those of the legacy PDCCH structure may be used as necessary.

Meanwhile, if CIF is enabled, PDSCH/PUSCH resources on one DL/UL CC indicated by a CIF from among multiple aggregated CCs may be assigned to a PDCCH of a specific DL CC. In this case, CIF may be additionally defined in the legacy PDCCH DCI format or be defined as a fixed field being 3 bits long, and the CIF location may be fixed regardless of the DCI format size. In this case, the same coding scheme, the same CCE based resource mapping, and the same DCI format as those of the legacy PDCCH structure may also be applied.

Even in the case where the CIF is present, a base station (BS) can allocate a DL CC set to be monitored, resulting in reduction in a load caused by the blind decoding of a UE. PUCCH monitoring CC set is a part of the entirely aggregated DL CC, and the UE can perform detection/decoding of a PDCCH in the corresponding CC set only. That is, in order to perform scheduling PDSCH/PUSCH for a UE, the BS can transmit a PDCCH only through the PDCCH monitoring CC set. The PDCCH monitoring DL CC set may be UE-specifically, UE group-specifically, or cell-specifically established. For example, if three DL CCs are aggregated as shown in FIG. 15, DL CC A may be set to a PDCCH monitoring DL CC. If CIF is disabled, a PDCCH on each DL CC may schedule only a PDSCH of DL CC A. Meanwhile, if the CIF is disabled, not only a PDCCH on DL CC A but also a PDSCH on other DL CCs can be scheduled. If DL CC A is set to PDCCH monitoring CC, PDSCH is not transmitted to DL CC B and DL CC C.

In the system to which the above-mentioned carrier aggregation is applied, a UE may receive several PDSCHs through several DL carriers. In this case, the UE may have to transmit ACK/NACK of each data through a single UL CC in a single subframe. In case of transmitting multiple ACK/NACKs using PUCCH format 1a/1b in a single subframe, high Tx power is needed, PAPR for UL transmission is increased, and the Tx power amplifier is ineffectively used, such that a transmittable distance from the BS to the UE may be reduced. In order to transmit several ACK/NACKs over a single PUCCH, ACK/NACK bundling or ACK/NACK multiplexing may be applied.

In addition, it may be necessary to transmit ACK/NACK information, that is used for a large amount of DL data according to the application of carrier aggregation and/or a large amount of DL data transmitted in several DL subframes of a TDD system, over a PUCCH in one subframe. In this case, if the number of ACK/NACK bits to be transmitted is higher than the number of bits supportable by ACK/NACK bundling or multiplexing, it is impossible to correctly transmit ACK/NACK information using the above-mentioned methods.

Next, the ACK/NACK multiplexing scheme will hereinafter be described.

In case of ACK/NACK multiplexing, contents of the ACK/NACK signal in response to multiple data units can be identified by one combination of an ACK/NACK unit used for actual ACK/NACK transmission and any one of QPSK-modulated symbols. For example, it is assumed that one ACK/NACK unit carries information of 2 bits and receives a maximum of 2 data units. In this case, it is assumed that HARQ ACK/NACK for each received data unit is represented by one ACK/NACK bit. In this case, a transmitter for transmitting data can identify the ACK/NACK result as shown in the following Table 5.

TABLE 5

| HARQ-ACK(0), HARQ-ACK(1) | $n_{PUCCH}^{(1)}$ | b(0), b(1) |
|---|---|---|
| ACK, ACK | $n_{PUCCH,1}^{(1)}$ | 1, 1 |
| ACK, NACK/DTX | $n_{PUCCH,0}^{(1)}$ | 0, 1 |

TABLE 5-continued

| HARQ-ACK(0), HARQ-ACK(1) | $n_{PUCCH}^{(1)}$ | b(0), b(1) |
|---|---|---|
| NACK/DTX, ACK | $n_{PUCCH,1}^{(1)}$ | 0, 0 |
| NACK/DTX, NACK | $n_{PUCCH,1}^{(1)}$ | 1, 0 |
| NACK, DTX | $n_{PUCCH,0}^{(1)}$ | 1, 0 |
| DTX, DTX | N/A | N/A |

In Table 5, HARQ-ACK(i) (where i=0, 1) indicates the ACK/NACK result of the data unit (i). As described above, since it is assumed that a maximum of two data units (Data Unit 0 and Data Unit 1) are received, Table 5 includes HARQ-ACK(0) as the ACK/NACK result of Data Unit 0, and includes HARQ-ACK(1) as the ACK/NACK result of Data Unit 1. In Table 5, Discontinuous Transmission (DTX) may indicate that a data unit corresponding to HARQ-ACK(i) is not transmitted or may indicate that the receiver does not detect the presence of the data unit corresponding to HARQ-ACK(i). In addition, $n_{PUCCH,X}^{(1)}$ is an ACK/NACK unit used for actual ACK/NACK transmission. If a maximum of two ACK/NACK units are present, the two ACK/NACK units may be represented by $n_{PUCCH,0}^{(1)}$ and $n_{PUCCH,1}^{(1)}$, respectively. In addition, b(0),b(1) is two bits transmitted by the selected ACK/NACK unit. A modulation symbol transmitted through the ACK/NACK unit is determined by the bits b(0), b(1).

For example, if the receiver has successfully received and decoded two data units (i.e., refer to the case of 'ACK, ACK' of Table 5), the receiver transmits two bits (1, 1) using the ACK/NACK unit $n_{PUCCH,1}^{(1)}$. Alternatively, under the condition that the receiver receives two data units, if the first data unit (i.e., Data Unit 0 corresponding to HARQ-ACK(0)) fails in decoding and the second data unit (i.e., Data Unit 1 corresponding to HARQ-ACK(1)) succeeds in decoding (i.e., refer to the case 'NACK/ACK, ACK' of Table 5), the receiver transmits two bits (0,0) using the ACK/NACK unit $n_{PUCCH,1}^{(1)}$.

As described above, selection of the ACK/NACK unit (i.e., selection of $n_{PUCCH,0}^{(1)}$ or $n_{PUCCH,1}^{(1)}$ in Table 5) and a combination (i.e., a combination of b(0),b(1) of actual bit contents of the transmitted ACK/NACK unit are mapped or linked to the actual ACK/NACK contents, such that ACK/NACK information of several data units can be transmitted using one ACK/NACK unit. The above-mentioned ACK/NACK principle is extended without any change, such that ACK/NACK of two or more data units can be easily multiplexed.

In the ACK/NACK multiplexing scheme, if at least one ACK basically exists in all data units, NACK and DTX may not be distinguished from each other (that is, as can be seen from NACK/DTX of Table 5, NACK and DTX may be coupled to each other), because it is impossible for only a combination of the ACK/NACK unit and the QPSK-modulated symbol to reflect all ACK/NACK states (i.e., ACK/NACK hypotheses) generable when a user desires to distinctively represent NACK and DTX. On the other hand, if ACK is not present in all data units (that is, if only NACK or DTX is present in all data units), one definite NACK case in which only one of HARQ-ACK(i) values is definitely set to NACK (that is distinguished from DTX) can be defined. In this case, the ACK/NACK unit corresponding to a data unit of one definite NACK may be reserved to transmit several ACK/NACK signals.

Semi-Persistent Scheduling (SPS)

DL/UL SPS(semi-persistent scheduling) L/L RRC(Radio Resource Control) signaling informs the UE of information as to which subframe is to be used for SPS transmission/reception (using a subframe period and offset), and activation and release of the actual SPS are performed through PDCCH. That is, although the UE receives SPS through RRC signaling, it does not immediately SPS Tx/Rx, and performs the SPS operation after receiving a PDCCH (i.e., PDCCH where SPS C-RNTI is detected) indicating activation (or reactivation). That is, if SPS activation PDCCH is received, frequency resources caused by allocation of an RB indicated by the received PDCCH are allocated, the modulation and coding rate based on MCS information is applied, such that Tx/Rx operations can be carried out using a subframe period and offset assigned through RRC signaling. On the other hand, upon receiving a PDCCH indicating SPS release, the UE stops the Tx/Rx operation. Although the UE stops the Tx/Rx operation, if the UE receives a PDCCH indicating activation (or reactivation), the UE can restart the Tx/Rx operation using the subframe period and offset assigned by RRC signaling in response to RB assignment indicated by the received PDCCH, MCS, etc.

In case of PDCCH formats prescribed in the 3GPP LTE, DCI format 0 is defined for uplink, and various formats (DCI format 1, 1A, 1B, 1C, 1D, 2, 2A, 3, 3A, etc.) are defined for downlink. A variety of control information, [for example, hopping flag, RB allocation, Modulation Coding Scheme (MCS), Redundancy Version (RV), New Data Indicator (NDI), Transmit Power Control (TPC), cyclic shift DM RS (demodulation reference signal), UL index, Channel Quality Information (CQI) request, DL assignment index, HARQ process number, TPMI (Transmitted precoding matrix indicator), Precoding Matrix Indicator (PMI) confirmation, etc.] may be transmitted as an eclectically selected combination according to individual usages.

More specifically, if PDCCH is used for SPS scheduling activation/release, CRC of a DCI transmitted over a PDCCH can be masked to SPS C-RNTI. In this case, the setting result of NDI=0 can be validated. In case of SPS activation, a combination of bit fields is set to zero (0) as shown in the following Table 6, such that the set result can be used as a virtual CRC.

TABLE 6

| | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

If an error incapable of being checked by CRC has occurred, the virtual CRC is adapted to determine whether the corresponding bit field value is a promised value, such that it can provide additional error detection capability. Although an error occurs in a DCI assigned to another UE, provided that this UE does not detect the corresponding error and mistakes the error for its own SPS activation, the UE continuously uses the corresponding resources, such that one error may cause the persistent problem. Therefore, the virtual CRC can prevent the SPS from being wrongly detected.

In case of SPS release, bit field values are established as shown in the following Table 7, such that the established values may be used as virtual CRCs.

TABLE 7

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

PUCCH Piggyback

In uplink transmission of the legacy 3GPP LTE system (e.g., Release-8) system, in order to effectively utilize the power amplifier of the UE, single carrier transmission including good PAPR (Peak-to-Average Power Ratio) characteristics or good CM (Cubic Metric) characteristics must be maintained. That is, in case of PUSCH transmission of the legacy system, single carrier characteristics of data to be transmitted can be maintained through DFT precoding. In case of PUCCH transmission, information loaded on a sequence having single carrier characteristics is transmitted, such that single carrier characteristics can be maintained. However, if DFT-precoded data is non-contiguously assigned on a frequency axis, or if PUSCH and PUCCH are simultaneously transmitted, such single carrier characteristics are broken.

Figure 16:
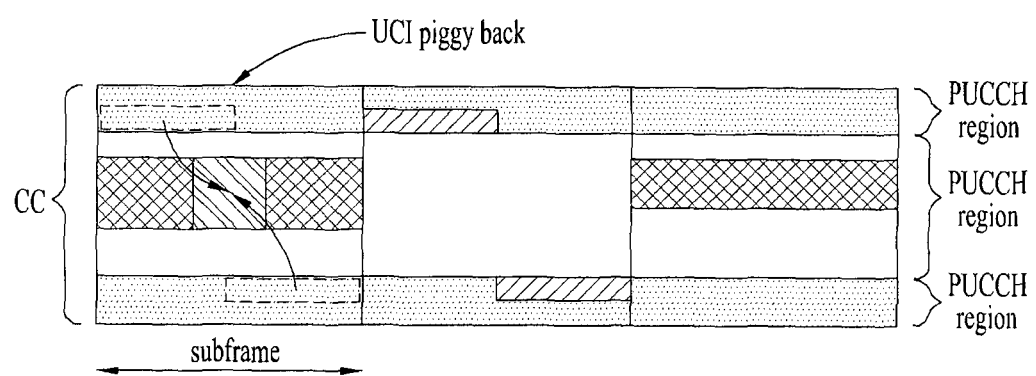
FIG. 16 is a conceptual diagram illustrating a method for transmitting uplink control information over a PUSCH.

Therefore, if PUSCH transmission is present in the same subframe as in PUCCH transmission as shown in FIG. 16, UCI (Uplink Control Information) to be transmitted over a PUCCH is piggybacked along with data through a PUSCH, such that single carrier characteristics can be maintained.

As descried above, the legacy LTE UE is unable to simultaneously transmit PUCCH and PUSCH, such that it uses a method for multiplexing UCI (CQI/PMI, HARQ-ACK, RI, etc.) into a PUSCH region within a subframe for PUSCH transmission. For example, if CQI and/or PMI must be transmitted in a subframe assigned for PUSCH transmission, UL-SCH data and CQI/PMI are multiplexed before DFT-spreading, such that control information and data can be simultaneously transmitted. In this case, UL-SCH data is rate-matching-processed in consideration of CQI/PMI resources. In addition, control information (for example, HARQ ACK, RI, etc.) can be multiplexed into a PUSCH region by puncturing UL-SCH data.

Figure 17:
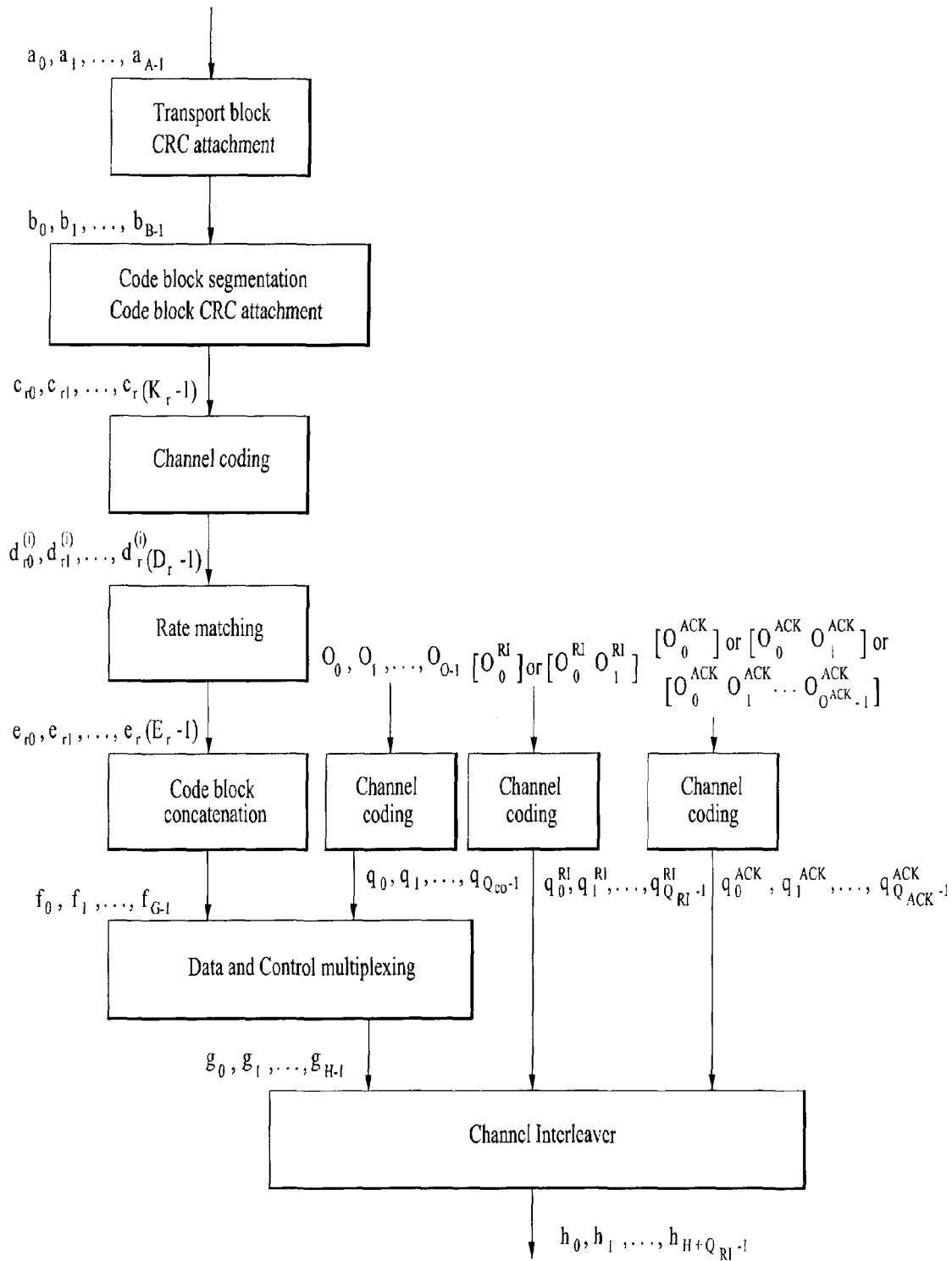
FIG. 17 is a conceptual diagram illustrating a method for multiplexing uplink data and control information.

FIG. 17 is a conceptual diagram illustrating a method for multiplexing uplink data and control information.

Referring to FIG. 17, after Cyclic Redundancy Check (CRC) for Transport Block (TB) is attached to a transport block (TB) $(a_0, a_1, \ldots, a_{A-1})$ that must be transmitted via uplink, data multiplexed with control information is divided into multiple code blocks (CBs) according to a TB size, and CRC for CB is attached to the multiple CBs. Channel coding is applied to the resultant value. In addition, after the channel-coded data is rate-matched, CBs are combined with each other, such that the combined CBs are multiplexed with control signals in a subsequent process.

On the other hand, CQI/PMI$(o_0, o_1, \ldots, o_{o-1})$ is channel-encoded separately from data. The channel-coded CQI/PMI is multiplexed with data. The data multiplexed with CQI/PMI information is input to a channel interleaver.

In addition, rank information ($[o_0^{RI}]$ or $[o_0^{RI} o_1^{RI}]$) is also channel-encoded separately from data in step S511. The channel-encoded rank information is inserted into some parts of the interleaved signal through puncturing or other processing.

In case of ACK/NACK information ($[o_0^{ACK}]$ or $[o_0^{ACK} o_1^{ACK}]$ ...), channel encoding is performed separately from CQI/PMI and rank information. The channel-encoded ACK/NACK information is inserted into some parts of the interleaved signals through puncturing or other processing.

PUCCH Resources

As described above, the TDD system may have to transmit ACK/NACK of multiple PDSCHs transmitted from several DL subframes within one UL subframe. In addition, the carrier aggregation system may have to transmit ACK/NACK of multiple PDSCHs transmitted over multiple DL CCs within one UL subframe. Furthermore, if carrier aggregation is applied to the TDD system, the TDD system may have to transmit ACK/NACK signals of many PDSCHs for use in several DL subframes or several DL CCs within one UL subframe.

Generally, ACK/NACK transmitted at an UL subframe (n) may indicate the decoding result of a PDSCH transmitted on N1 DL CCs at a DL subframe (n-k1), may indicate the decoding result of a PDSCH transmitted on N2 DL CCs at a DL subframe (n-k2) . . . , and may indicate the decoding result of a PDSCH transmitted on Nm DL CCs at a DL subframe (n-km). In this case, N1, N2, . . . , Nm indicating the number of DL CCs related to PDSCH transmission in individual DL subframes may be identical to each other or be different from each other as necessary.

Figure 18:
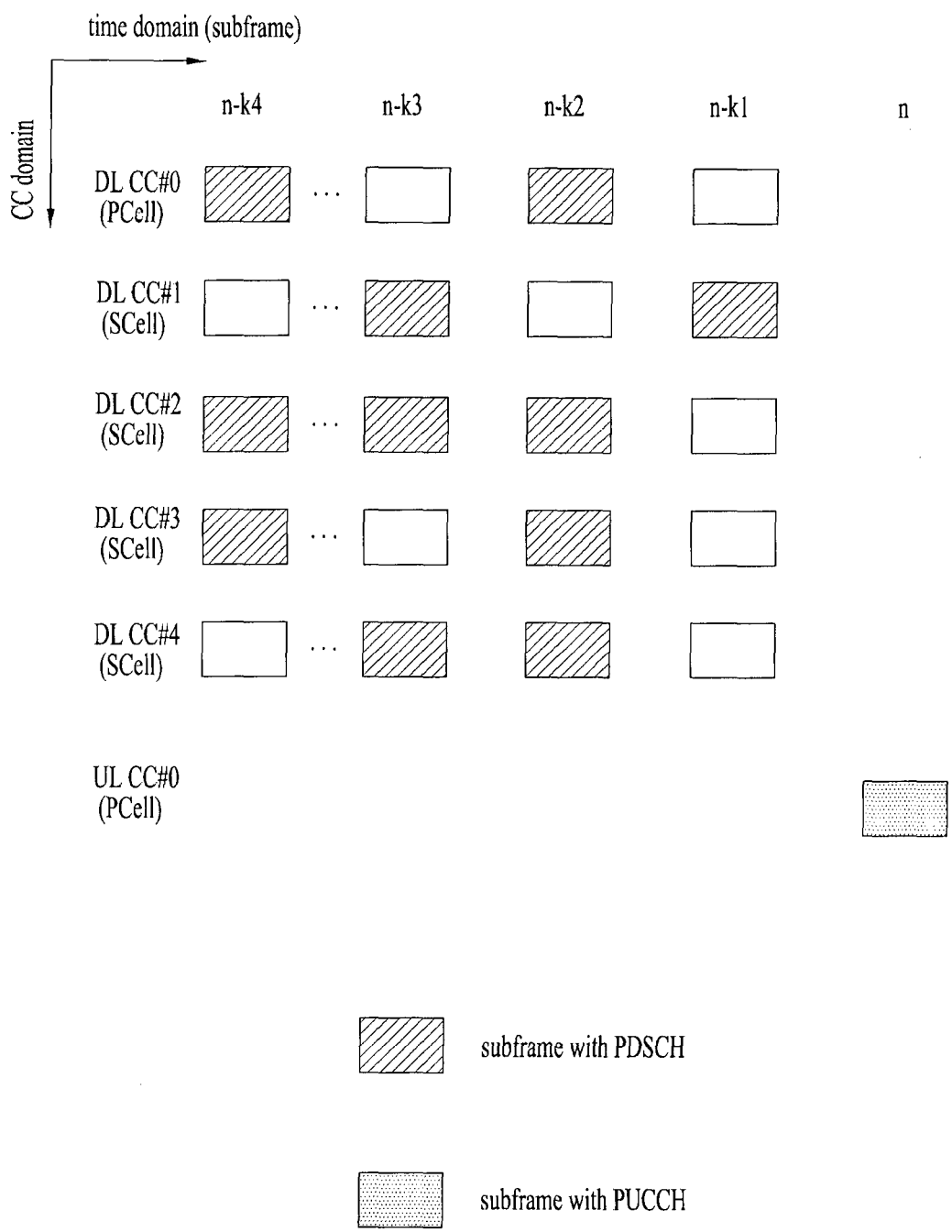
FIG. 18 is a conceptual diagram illustrating a method for transmitting uplink ACK/NACK in response to uplink transmission on multiple downlink subframes and multiple carriers.

For example, as can be seen from FIG. 18, ACK/NACK information transmitted over a PUCCH on UL CC#0 at a subframe (n) may indicate the decoding result of a PDSCH transmitted over one DL CC (DL CC#1) at a DL subframe (n-k1), may indicate the decoding result of a PDSCH transmitted over four DL CCs (DL CC#0, #2, #3, #4) at a DL subframe (n-k2), may indicate the decoding result of a PDSCH transmitted over three DL CCs (DL CC#1, #2, #4) at a DL subframe (n-k3), and may indicate the decoding result of a PDSCH transmitted over three DL CCs (DL CC#0, #2, #3) at a DL subframe (n-k4).

In this way, in order to transmit ACK/NACK of several PDSCHs for use in several DL subframes and/or several DL CCs through a PUCCH within one UL subframe, a new PUCCH format may be used. For example, the decoding result of each of the PDSCHs (each PDSCH is relevant to a maximum of 2 TBs or (2 codewords) in case of downlink MIMO transmission) is represented by a bitstring, the resultant result is properly channel-encoded, and the channel encoded result is then transmitted through PUCCH format 3 as shown in FIG. 13.

In case of using PUCCH format 3, there is a need to decide a specific scheme that indicates which one of PUCCH resources is employed by a UE. For example, a base station (BS) may inform the corresponding UE of PUCCH resource candidates capable of being used as PUCCH resources by the UE, through higher layer signals. In addition, it is also possible to employ the scheme for indicating which PUCCH resource candidate from among the above-mentioned candidates is to be used for actual ACK/NACK transmission using a specific field.

Figure 19:
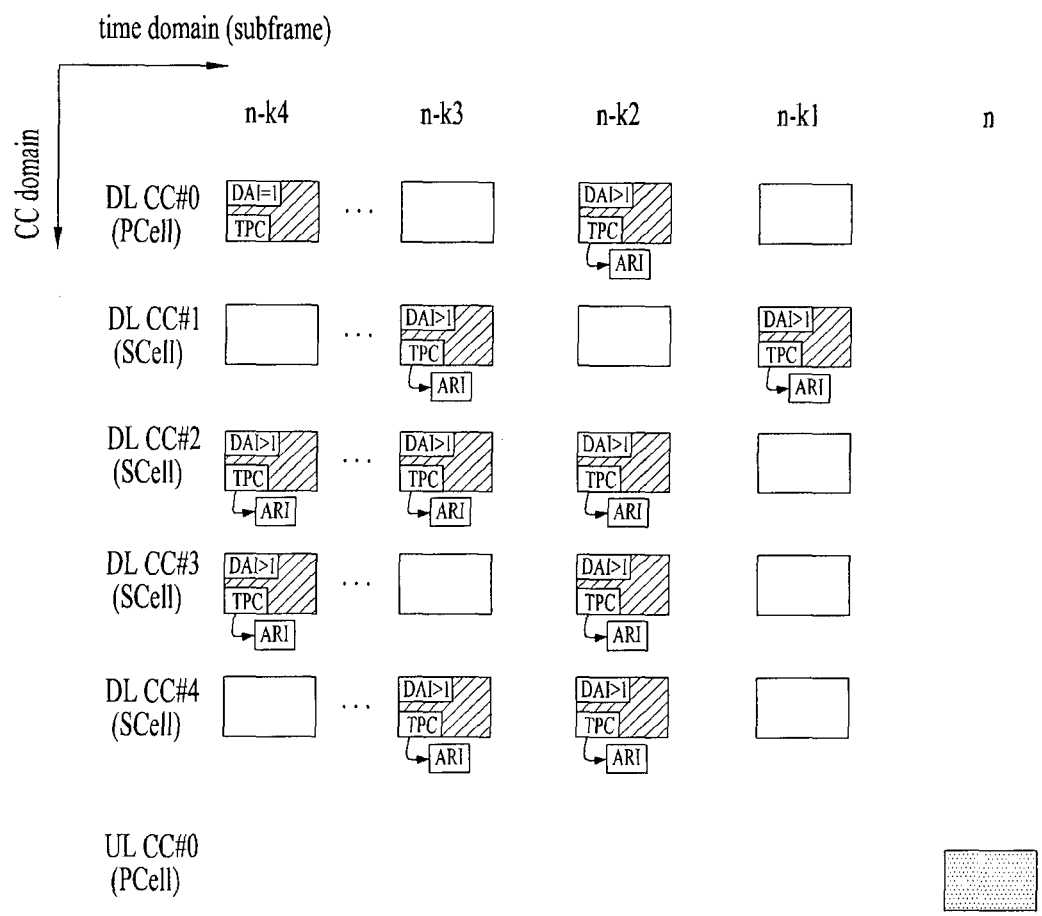
FIG. 19 is a conceptual diagram illustrating a method for indicating PUCCH resources for PUCCH format 3.

FIG. 19 is a conceptual diagram illustrating a method for indicating PUCCH resources for PUCCH format 3. FIG. 19 assumes that ACK/NACK for PDSCH transmission for use in several DL subframes and several DL CCs is transmitted over a PUCCH of one UL CC of the subframe (n).

For example, a 2-bit transmission power control (TPC) field present in a DCI format for DL assignment may be adapted to indicate PUCCH resources. In more detail, the TPC field is interpreted as an original TPC value at a PDCCH corresponding to first DL assignment. In PDCCH(s) corresponding to the next DL assignment, the TPC field may be interpreted as a field (i.e., ACK/NACK Resource Indicator (ARI) field) indicating PUCCH resources to be used for ACK/NACK transmission, such that the TPC field may be used for another usage.

Information as to which PDCCH correspond to first DL assignment may be determined from the value of a downlink assignment index (DAI) field contained in the corresponding PDCCH. The DAI field contained in a PDCCH is defined for the TDD system, and is considered to be an index assigned for DL assignment (or PDSCH scheduling). For example, a PDCCH of DAI=1 may be determined to be a first PDCCH for DL assignment. Therefore, a PDCCH of DL CC#0 at a DL subframe (n-k4) of DAI=1 is used as a first PDCCH for DL assignment, such that the TPC field of the corresponding PDCCH is interpreted to have an original usage (i.e., TPC). As can be seen from FIG. 19, each DAI of each of the remaining PDCCHs is higher than '1' (i.e., DAI>1), such that the TPC field of the corresponding PDCCH is interpreted to be an ARI.

Therefore, provided that PUCCH format 3 is applied to the UE, PUCCH resources for transmitting ACK/NACK of several PDSCHs transmitted over several subframes and/or several CCs may be determined from PDCCH ARI (i.e., TPC field of PDCCH of DAI>1). For example, if four PUCCH resource candidates ($n^{(3)}_{PUCCH,0}$, $n^{(3)}_{PUCCH,1}$, $n^{(3)}_{PUCCH,2}$, $n^{(3)}_{PUCCH,3}$) are established in a UE configured with PUCCH format 3 by a higher layer signal, and if the ARI field of 2 bits is set to '01', a second PUCCH resource ($n^{(3)}_{PUCCH,1}$) from among four PUCCH resource candidates may be used for ACK/NACK transmission.

If PUCCH format 3 is established in the UE as described above, the UE may receive only one DL assignment PDCCH. In this case, receiving only one DL assignment PDCCH indicates the presence of only one DL PDCCH not only in one or more DL subframes but also in one or more carriers, under the condition that ACK/NACK of DL transmission over the one or more DL subframes (DL subframes n-k1, . . . , n-k4 of FIG. 19) and the one or more carriers (DL CC#0, . . . , DL CC#4 of FIG. 19) is transmitted in one UL subframe (i.e., subframe n of FIG. 19). For clarity of description, the above-mentioned situation is represented by reception of only one PDCCH (or only one PDSCH).

Embodiment 1

If PUCCH format 3 is established for the UE as described above, the UE may not decide PUCCH resources. For example, as can be seen from FIG. 19, if the UE receives only one PDCCH of DAI=1 and does not receive other PDCCHs, this means that the UE receives no ARI, such that the UE may not decide which PUCCH resource is to be used for ACK/NACK transmission.

Provided that the UE receives only one DL assignment PDCCH so as to solve the aforementioned problem, ACK/NACK of one PDSCH can be transmitted, such that PUCCH format 3 capable of supporting a large number of ACK/NACK bits need not be used for ACK/NACK transmission. Therefore, if the UE receives only one DL assignment PDCCH (i.e., if the UE receives no ARI such that it does not decide ACK/NACK resources for PUCCH format 3), the legacy PUCCH format 1a/1b may be used. If the UE uses PUCCH format 1a/1b although PUCCH format 3 is assigned to the UE, PUCCH format 1a/1b resources may be implicitly decided from PDCCH CCE indexes as shown in FIG. 10.

On the other hand, PUCCH resource index mapping of a PDCCH CCE index of FIG. 10 is applied to the legacy PDCCH transmitted in a control region (See FIG. 3) of a downlink subframe, and is not applied to a PDCCH transmitted in a data region (See FIG. 3) of a downlink subframe. PDCCH transmitted in a data region of a downlink subframe may be set to R-PDCCH (that is transmitted from a BS to an RN in a region 1022 of FIG. 10) of the RN or e-PDCCH. e-PDCCH can be applied to a wireless communication system in which the increase of control information or the increase of UE numbers is expected. The e-PDCCH can be transmitted in a data region of a DL subframe, such that it serves as a control channel capable of supporting transmission of control information for many UEs. Therefore, if PUCCH resources (such as R-PDCCH and/or e-PDCCH) mapped to CCE index are not present, it is impossible to transmit ACK/NACK because PUCCH resources are not determined.

In order to solve the above-mentioned problems, default PUCCH resources to be used for no ARI transmission can be semi-statically established for a UE (or RN) through higher layer signal (e.g., RRC signaling). For example, provided that only one DL assignment PDCCH (i.e., one PDSCH) is transmitted to a UE (or RN) in which PUCCH format 3 is used, the UE (or RN) can transmit ACK/NACK using the above default PUCCH resources established through higher layer signaling.

In this case, the default PUCCH resources may be set to a specific one from among PUCCH format 3 resource candidates pre-signaled from the BS to the UE through a higher layer signal. For example, in association with the UE (or RN) in which PUCCH format 3 is to be used, four PUCCH resource candidates ($n^{(3)}_{PUCCH,0}$, $n^{(3)}_{PUCCH,1}$, $n^{(3)}_{PUCCH,2}$, $n^{(3)}_{PUCCH,3}$) are established by a higher layer signal, a specific one (for example, a first PUCCH resource $n^{(3)}_{PUCCH,0}$) from among the candidates may be set to the default PUCCH resource. In this case, provided that the UE (or RN) receives only one DL assignment PDCCCH (i.e., a single PDSCH), the UE can transmit ACK/NACK of the single PDSCH using PUCCH format 3 on the candidate ($n^{(3)}_{PUCCH,0}$).

Alternatively, the default PUCCH resources may be PUCCH format 1a/1b resources semi-statically established by the BS through higher layer signals (for example, RRC signaling), such that the PUCCH format 1a/1b resources may be separately signaled to the UE (or RN) by the BS. For example, PUCCH 1a/1b resource ($n^{(1)}_{PUCCH}$) may be independently established for a UE (or RN) by a higher layer. In this case, provided that the UE (or RN) receives only one DL assignment PDCCH (i.e., one PDSCH), the UE can transmit ACK/NACK for the one PDSCH using PUCCH format 1a/1b at the candidate ($n^{(1)}_{PUCCH}$), and $n^{(1)}_{PUCCH}$ may be determined by higher layer configuration. The reason why the UE (or RN) does not receive ARI is the presence of only one DL assignment. As a result, although PUCCH format 1a/1b capable of supporting the size of 1 or 2 bits, it is possible to effectively indicate success or failure of the decoding of one PDSCH.

Figure 20:
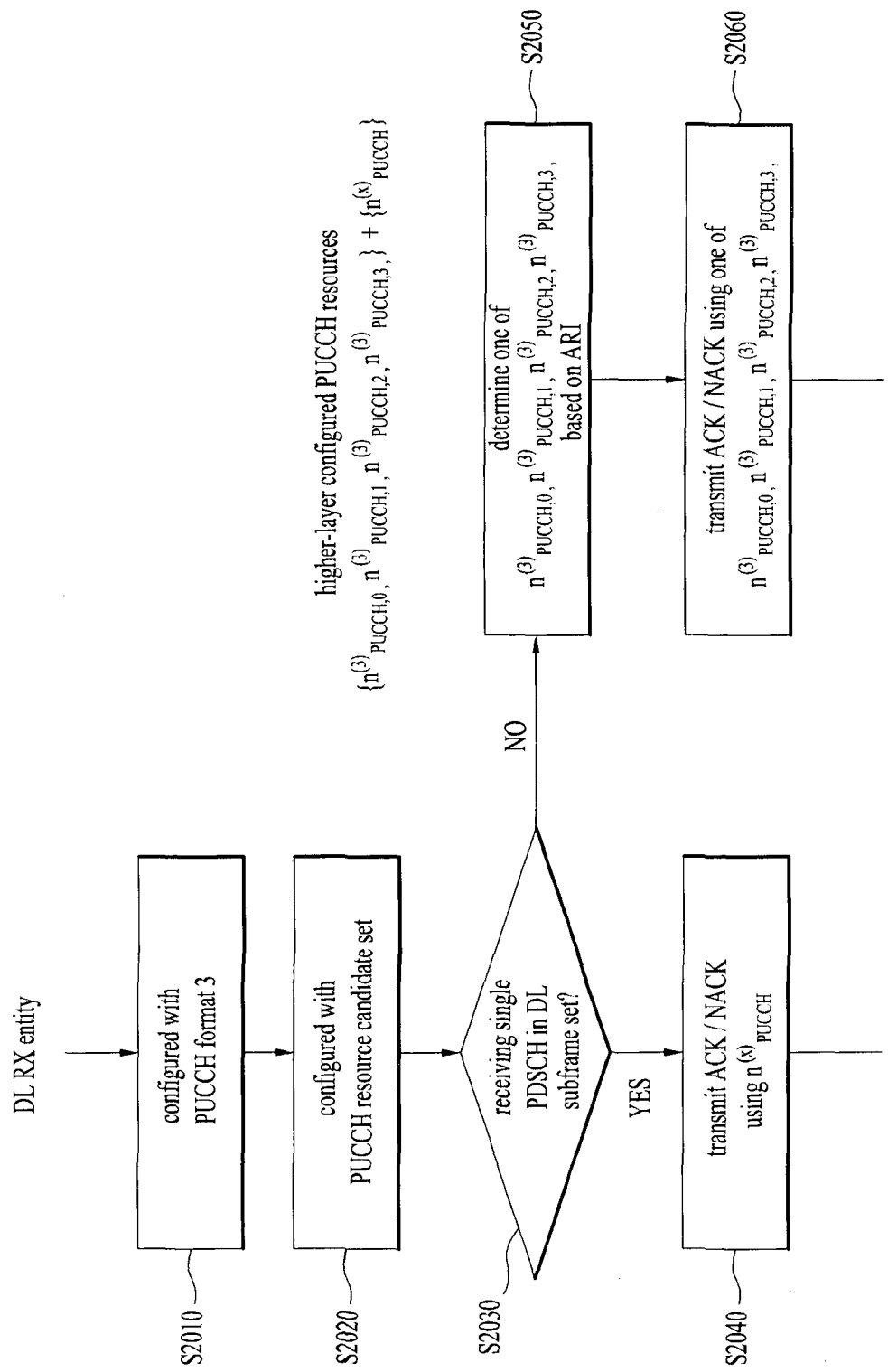
FIG. 20 is a flowchart illustrating ACK/NACK transmission of a downlink reception entity according to one embodiment of the present invention.

FIG. 20 is a flowchart illustrating ACK/NACK transmission of a downlink reception entity according to one embodiment of the present invention. Although a UE is exemplarily disclosed as a representative DL reception entity as shown in FIG. 20, the scope or spirit of the present invention is not limited thereto, and the same description can also be applied to RN operations.

PUCCH format 3 may be assigned to the UE by a higher layer in step S2010.

Resource candidate sets ($n^{(3)}_{PUCCH,0}$, $n^{(3)}_{PUCCH,1}$, $n^{(3)}_{PUCCH,2}$, $n^{(3)}_{PUCCH,3}$) for PUCCH format 3 may be assigned to the UE by a higher layer in step S2020. Differently from the above-mentioned operation, one PUCCH resource ($n^{(x)}_{PUCCH}$) may be established in the UE. In this case, $n^{(x)}_{PUCCH}$ may be PUCCH format 1 resource $n^{(1)}_{PUCCH}$) decided by higher layer configuration, or may be a specific one (for example, $n^{(3)}_{PUCCH,0}$) from among PUCCH format 3 resource candidates established for the UE.

In step S2030, the UE may determine whether only one PDSCH is received through a DL subframe set. In this case, the DL subframe set may be composed of one UL subframe and one subframe or two or more subframes including the relationship of data transmission and ACK/NACK transmission. If ACK/NACK for DL transmission at the subframes (n-k1, . . . , n-k4) is transmitted at the subframe (n) as shown in FIG. 19, a DL subframe set of FIG. 20 may correspond to the subframes (n-k1, . . . , n-k4). If only one PDSCH is received through a DL subframe set in step S2030, the operation goes to the next step S2040. If only one PDSCH is not received through a DL subframe set in step S2040, the operation goes to the next step S2050.

In step S2040, the UE can transmit ACK/NACK using PUCCH resource $n^{(x)}_{PUCCH}$) separately established separately from PUCCH format 3 resource of the step S2020. For example, if PUCCH resource $n^{(x)}_{PUCCH}$) established by a higher layer of the step S2020 is determined to be PUCCH resource $n^{(1)}_{PUCCH}$), the UE can transmit ACK/NACK over the PUCCH resource $n^{(1)}_{PUCCH}$ using PUCCH format 1a/1b in step S2040. Alternatively, if PUCCH resource ($n^{(x)}_{PUCCH}$) established by a higher layer is determined to be PUCCH resource ($n^{(3)}_{PUCCH,0}$) in step S2020, the UE can transmit ACK/NACK on the PUCCH resource ($n^{(3)}_{PUCCH,0}$) using PUCCH format 3 in step S2040.

On the other hand, the UE can determine one of resource candidate sets ($n^{(3)}_{PUCCH,0}$, $n^{(3)}_{PUCCH,1}$, $n^{(3)}_{PUCCH,2}$, $n^{(3)}_{PUCCH,3}$) for PUCCH format 3 on the basis of a value of the TPC field (i.e., the ARI field) on PDCCH of DAI>1 in step S2050. The UE may transmit ACK/NACK on the determined PUCCH format 3 in step S2060.

As described above, if PUCCH resource (i.e., a specific PUCCH format 3 resource established by a higher layer or a PUCCH format 1 resource established by a higher layer) to be used when a DL reception entity (UE or RN) where which PUCCH format 3 is established receives only one PDSCH through a predetermined subframe set can be efficiently utilized when the DL reception entity receives the PDSCH scheduling result through R-PDCCH and/or e-PDCCH.

Embodiment 2

As a method for assigning PUCCH resources to a UE (or RN) designed to receive the PDSCH scheduling result through R-PDCCH and/or e-PDCCH under PUCCH format 3, PUCCH format 3 resource may be semi-statically assigned per UE or RN. That is, one PUCCH format 3 resource may be semi-statically established to one UE (or RN) through a higher layer signal (e.g., RRC signaling). For example, instead of assigning four PUCCH resource candidates to one UE (or RN) and informing the UE (or RN) of information as to which PUCCH resource is to be used through the ARI field, one PUCCH format 3 resource to be used by one UE (or RN) may be directly established.

One UE (or RN) can always utilize PUCCH resources assigned to the UE or RN, such that there is no need to establish or utilize additional default PUCCH resources. Therefore, if the UE (or RN) transmits UL ACK/NACK at any time, the amount of wasted PUCCH resources can be reduced. In addition, if one PUCCH format 3 resource is semi-statically assigned to the UE (or RN), PUCCH format 3 resource to be used by the BS or UE (or RN) can be always constantly determined, such that the above-mentioned ARI need not be used. Therefore, the above-mentioned ARI (i.e., the TPC field of PDCCH of DAI>1) can be utilized for other usages.

Figure 21:
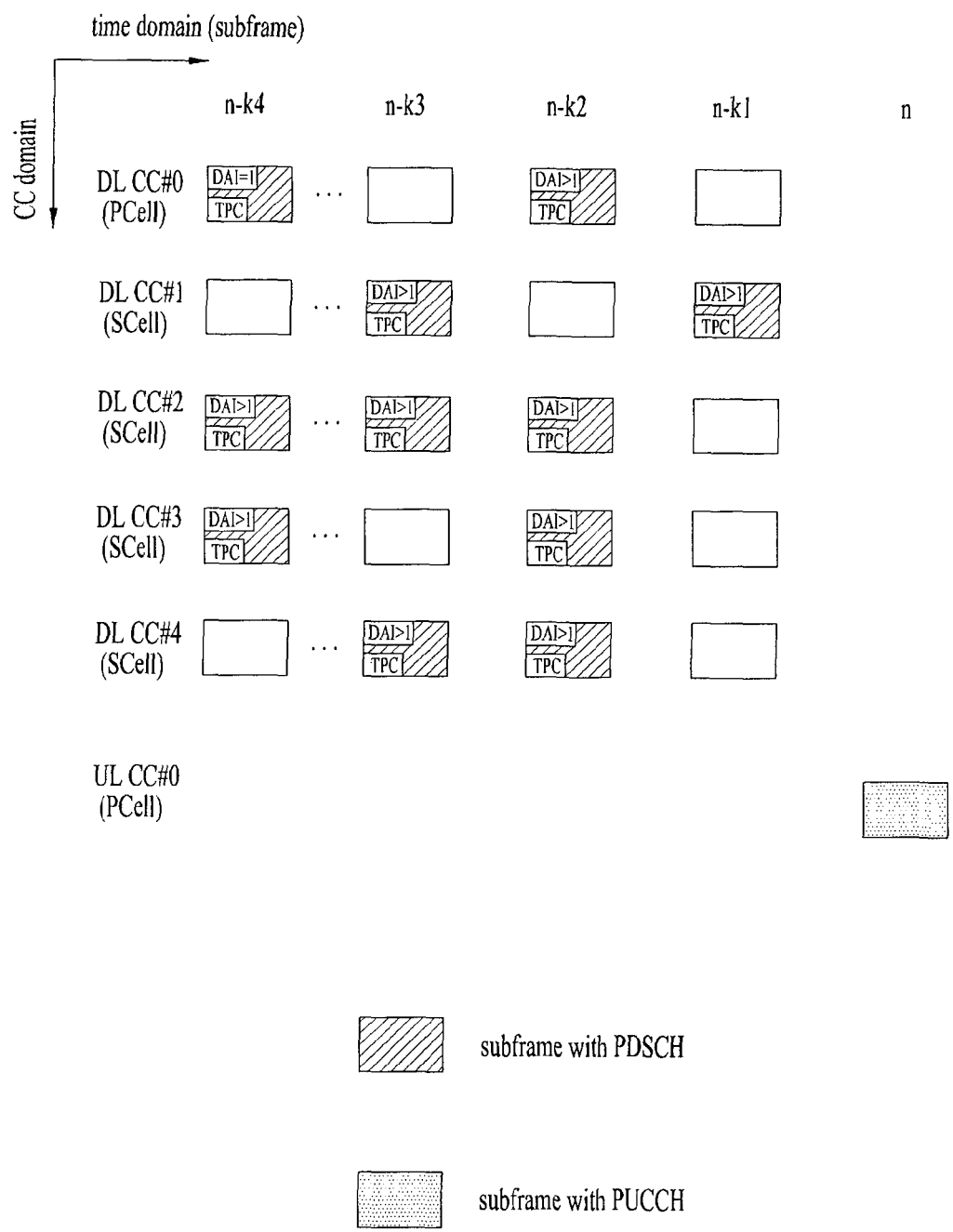
FIG. 21 is a conceptual diagram illustrating a method for using an ACK/NACK resource indicator as a transmission power control command.

The ARI field may be used as a TPC command as one example for employing the ARI field for other usages. FIG. 21 shows an example in which ARI is used as a TPC command. Referring to FIG. 21, even in the case of DL assignment (i.e., PDCCH of DAI>1) located after the second DL assignment, the TPC field of the UE (or RN) is not interpreted as the ARI, and may be interpreted as a TPC command indicating the original usage in the same manner as in the first DL assignment (i.e., PDCCH of DAI=1).

For example, if multiple DL assignments are transmitted to one UE (or RN), individual TPC commands of the multiple DL assignments may indicate different TPC values. Preferably, the UE (or RN) may use the sum of received TPC values as the last TPC value.

Alternatively, the same transmission power command may repeatedly appear on several PDCCHs. In this case, only when the received transmission power values are identical to each other (without accumulation), the UE or RN can use the corresponding power control value as the last power control value. In this case, if the received power control values are different from one another, PUCCH format 3 transmission may be performed without application of the power control command, or DL assignment PDCCH including the corresponding power control values may be discarded.

For example, time-variant channel change of the RN existing at a fixed location is not high, such that the scheme for repeating the same power control command may be more favorably utilized. For example, although the RN misses or drops one DL assignment from among several DL assignments, the TPC command indicated by another DL assignment can be applied.

Meanwhile, as another example for utilizing the ARI field as another usage, the ARI field may also be used for a virtual CRC. For example, the TPC field of DL assignment (i.e., PDCCH of DAI>1) to be performed after the second DL assignment is not used for the original TPC usage and the ARI usage. However, the TPC field may have a predetermined value as necessary. In this case, the UE (or RN) performs PDCCH decoding under the condition that the UE (or RN) recognizes that a TPC field (i.e., ARI field) of PDCCH to be used after the second assignment has a predetermined constant value, it is determined whether the ARI field of the actually received PDCCH indicates the predetermined constant value such that it is possible to more accurately recognize whether the corresponding PDCCH is correct or not.

Alternatively, as another example for utilizing the ARI field for another usage, the ARI field is used as a reserved field such that no separate meaning may be assigned to the reserved field. For example, a TPC field located after the second DL assignment (i.e., PDCCH of DAI>1) is not used for the original TPC usage and the ARI usage, and no meaning may be assigned to the TPC field as necessary. In this way, the fact that the PDCCH TPC field located after the second assignment has no meaning is pre-shared (or pre-recognized) by a BS and a UE (or RN), the UE (or RN) prevents the ARI from being interpreted for other usages (for example, TPC usage, etc.), such that the unintentional operation of the BS can be prevented by the UE (or RN).

As one method for assigning no meaning to the ARI field, the BS performs assignment of several PUCCH format 3 resources to be used as an ARI application target in such a manner that all PUCCH format 3 resources have the same indexes, such that actual meaning may be removed from the ARI as necessary.

Components described in the above-mentioned various embodiments may be applied independently, or two or more embodiments may be simultaneously applied, and the same contents will herein be omitted for convenience of description and better understanding of the present invention.

In addition, although the above-mentioned various embodiments of the present invention have exemplarily disclosed the BS acting as a DL transmission entity and the UE acting as a UL transmission entity, the scope or spirit of the present invention is not limited thereto, and it is obvious to those skilled in the art that the principle proposed in the present invention can also be applied to an arbitrary DL transmission entity (BS or RN) and an arbitrary DL reception entity (UE or RN) without departing from the spirit or scope of the invention. For example, proposed contents related to DL transmission from the BS to the RN may also be equally applied to DL transmission from the BS to the UE or from the RN to the UE. In conclusion, the principles of the present invention can also be applied to the above-mentioned embodiment.

Figure 22:
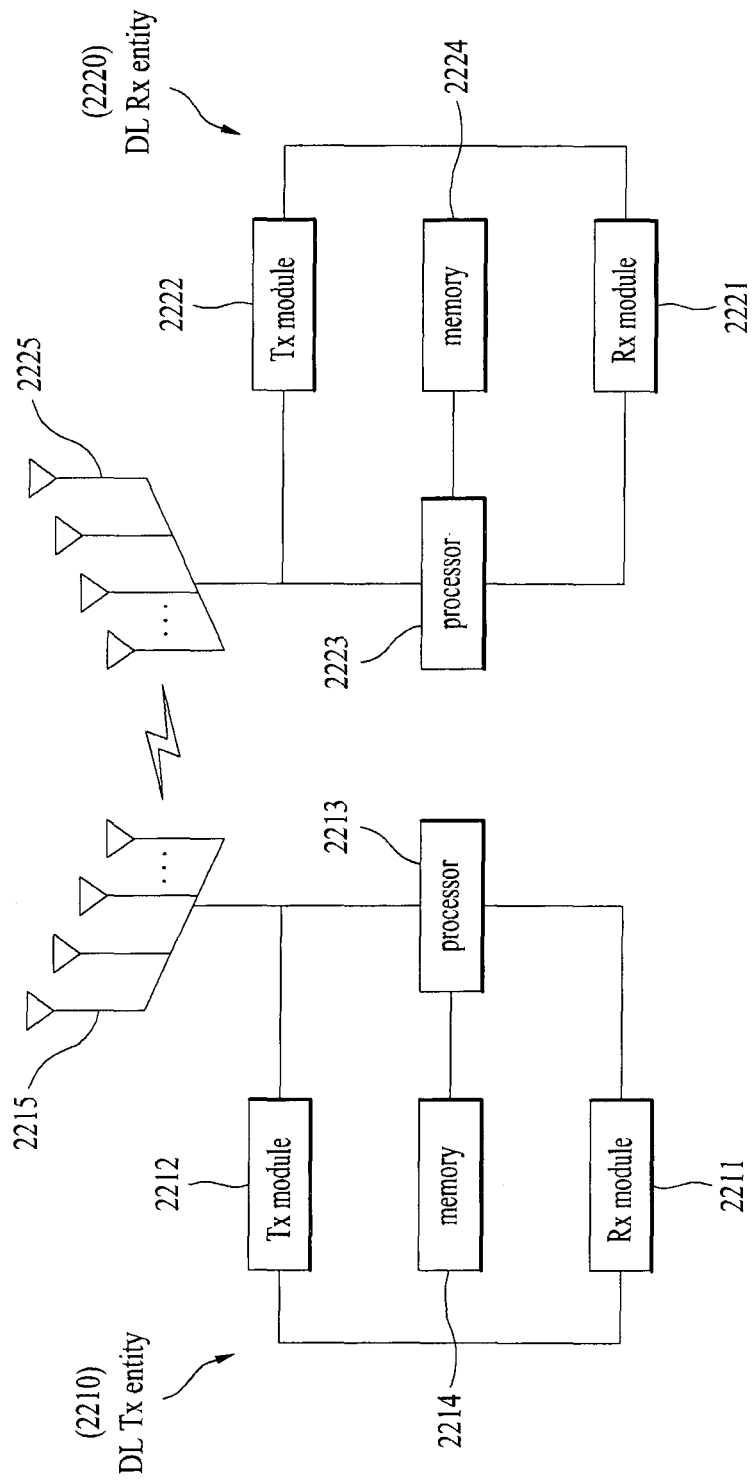
FIG. 22 is a block diagram illustrating a downlink transmitter and a downlink receiver according to embodiments of the present invention.

FIG. 22 is a block diagram illustrating a downlink transmitter and a downlink receiver according to embodiments of the present invention. In FIG. 22, a DL transmitter may correspond to a UL receiver, and a DL receiver may correspond to a UL transmitter.

Referring to FIG. 22, the DL transmitter 2210 may include an Rx module 2211, a Tx module 2212, a processor 2213, a memory 2214, and a plurality of antennas 2215. The plurality of antennas 2215 indicate a DL transmitter for supporting MIMO transmission and reception. The reception (Rx) module 2211 may receive a variety of signals, data and information on an uplink starting from either the UE or the RN. The Tx module 2212 may transmit a variety of signals, data and information on a downlink for the UE or the RN. The processor 2213 may provide overall control to the DL transmitter 2210.

The DL transmitter 2210 according to one embodiment of the present invention may be configured to receive UL ACK/NACK. The processor 2213 of the DL transmitter 2210 may perform DL transmission in a DL subframe set (including one or more DL subframes) through the Tx module 2212, and may enable the Rx module 2211 to receive ACK/NACK information for DL transmission of the DL subframe set within one UL subframe.

In this case, provided that a first PUCCH format (e.g., PUCCH format 3) is assigned to the DL receiver 2220, the DL transmitter 2210 may recognize that the DL receiver 2220 acting as the DL reception entity is going to basically transmitting the ACK/NACK information using the first PUCCH format. However, if the DL transmitter 2210 transmits only one PDSCH within the above DL subframe set, the DL receiver 2220 is unable to receive ARI (i.e., TPC of PDCCH of DAI>1), such that it can decide which one of first PUCCH format candidate resources is to be used. In addition, provided that the DL transmitter 2210 provides downlink control information (DCI) of the DL receiver 2220 over a PDCCH transmitted on the remaining OFDM symbols (for example, the data region of FIG. 3) other than initial N OFDM symbols (where N≤3) of a DL subframe through PDCCH (for example, R-PDCCH and/or e-PDCCH), it is impossible for the DL receiver 2220 to decide PUCCH resources on the basis of the mapping relationship between a PDCCH CCE index and a PUCCH resource index. Therefore, if one PDSCH is transmitted within the above-mentioned DL subframe set, the DL transmitter 2210 according to one embodiment of the present invention can receive ACK/NACK for DL transmission in the above-mentioned DL subframe set using a second PUCCH format (for example, PUCCH format 1a/1b). In this case, PUCCH resource for the second PUCCH format may also be established by a higher layer.

Besides, the processor 2213 of the DL transmitter 2210 processes information received at the DL transmitter 2210 and transmission information. The memory 2214 may store the processed information for a predetermined time. The memory 2214 may be replaced with a component such as a buffer (not shown).

Referring to FIG. 22, the DL receiver 2220 may include an Rx module 2221, a Tx module 2222, a processor 2223, a memory 2224, and a plurality of antennas 2225. The plurality of antennas 2225 indicates a DL receiver for supporting MIMO transmission and reception. The Rx module 2221 may include a first Rx module and a second Rx module. The Rx module 2221 may receive downlink signals, data and information from the DL transmitter 2210. The Tx module 2222 may transmit uplink signals, data and information to the DL transmitter 2210. The processor 2223 may provide overall control to the DL receiver 2220.

The DL receiver 2220 according to one embodiment of the present invention may be configured to transmitter UL ACK/NACK. The processor 2223 of the DL receiver 2220 may receives information regarding DL transmission in a DL subframe set (including one or more DL subframes) through the Rx module 2221, and may enable the Tx module 2222 to transmit ACK/NACK information for DL transmission of the DL subframe set within one UL subframe.

In this case, provided that a first PUCCH format (e.g., PUCCH format 3) is assigned to the DL receiver 2220, the DL receiver 2220 may basically transmit the ACK/NACK using the first PUCCH format. However, if the DL receiver 2220 receives only one PDSCH within the above DL subframe set, the DL receiver 2220 is unable to receive ARI (i.e., TPC of PDCCH of DAI>1), such that it can decide which one of first PUCCH format candidate resources is to be used. In addition, provided that the DL receiver 2220 receives a PDCCH (for example, R-PDCCH and/or e-PDCCH) transmitted on the remaining OFDM symbols (e.g., the data region of FIG. 3) other than initial N OFDM symbols (where N≤3) of a DL subframe, it is impossible for the DL receiver 2220 to decide PUCCH resources on the basis of the mapping relationship between a PDCCH CCE index and a PUCCH resource index. Therefore, if one PDSCH is transmitted within the above-mentioned DL subframe set, the DL receiver 2220 according to one embodiment of the present invention can receive ACK/NACK for DL transmission in the above-mentioned DL subframe set using a second PUCCH format (for example, PUCCH format 1a/1b). In this case, PUCCH resource for the second PUCCH format may also be established by a higher layer.

Besides, the processor 2223 of the DL receiver 2220 processes information received at the DL receiver 2220 and transmission information. The memory 2224 may store the processed information for a predetermined time. The memory 2224 may be replaced with a component such as a buffer (not shown).

The specific configurations of the DL transmitter 2210 and the DL receiver may be implemented such that the various embodiments of the present invention are performed independently or two or more embodiments of the present invention are performed simultaneously. Redundant matters will not be described herein for clarity.

The description of the DL transmitter 2210 shown in FIG. 22 may be applicable to the BS, or may also be applicable to a relay node (RN) acting as a DL transmission entity or UL reception entity without departing from the scope or spirit of the present invention. In addition, the description of the DL receiver 2210 shown in FIG. 22 may be applicable to the UE, or may also be applicable to a relay node (RN) acting as a UL transmission entity or DL reception entity without departing from the scope or spirit of the present invention.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR INVENTION

Various embodiments have been described id the best mode for carrying out the invention.

INDUSTRIAL APPLICABILITY

The embodiments of the present invention are applicable to various mobile communication systems. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting ACK/NACK information by a relay node (RN) in a wireless communication system, the method comprising:
   determining a physical uplink control channel (PUCCH) format and resource which are used for transmitting ACK/NACK information in response to a backhaul downlink transmission within a downlink subframe set, wherein the downlink subframe set includes M downlink subframes where M≥1, and the M downlink subframes are configured as Multicast Broadcast Single Frequency Network (MBSFN) subframes by the RN; and
   transmitting the ACK/NACK information through a backhaul uplink using the PUCCH format and resource in a single uplink subframe,
   wherein, when the RN is configured with a PUCCH format 3 and when one physical downlink shared channel (PDSCH) is transmitted within the downlink subframe set, the ACK/NACK information is transmitted using a PUCCH format 1a/1b on a PUCCH resource configured by a higher layer for the PUCCH format 1a/1b.

2. The method according to claim 1, wherein a physical downlink control channel (PDCCH) for the RN is mapped to remaining OFDM symbols other than initial N OFDM symbols (where N<3) of a subframe.

3. The method according to claim 2, wherein the PDCCH for the RN is an R-PDCCH.

4. The method according to claim 1, wherein:
   if two or more downlink assignment PDCCHs are transmitted within the downlink subframe set, one PUCCH resource for the PUCCH format 3 from among PUCCH resources configured by a higher layer for the PUCCH format 3 is decided by a transmission power control (TPC) field of a PDCCH having a downlink assignment index (DAI) higher than 1 (DAI>1).

5. The method according to claim 4, wherein the ACK/NACK information is transmitted using the PUCCH format 3 on the decided one PUCCH resource for the PUCCH format 3.

6. The method according to claim 1, wherein the wireless communication system is a time division duplex (TDD) wireless communication system.

7. The method according to claim 1, wherein more than one serving cell is configured for the RN.

8. A method for receiving ACK/NACK information from a relay node (RN) by a base station in a wireless communication system, the method comprising:
performing a backhaul downlink transmission within a downlink subframe set, wherein the downlink subframe set includes M downlink subframes where M≥1, and the M downlink subframes are configured as Multicast Broadcast Single Frequency Network (MBSFN) subframes by the RN; and
receiving ACK/NACK information through a backhaul uplink, in response to the backhaul downlink transmission in a single uplink subframe,
wherein, when the RN is configured with a PUCCH format 3 and when one physical downlink shared channel (PDSCH) is transmitted within the downlink subframe set, the ACK/NACK information is received using a PUCCH format 1a/1b on a PUCCH resource configured by a higher layer for the PUCCH format 1a/1b.

9. A relay node (RN) for transmitting ACK/NACK information in a wireless communication system, comprising:
a Rx module for receiving a downlink signal from a base station through a backhaul downlink;
a Tx module for transmitting an uplink signal to the base station through a backhaul uplink; and
a processor for controlling the RN including the Rx module and the Tx module,
wherein the processor is configured to:
determine a physical uplink control channel (PUCCH) format and resource which are used for transmitting ACK/NACK information in response to a backhaul downlink transmission within a downlink subframe set, wherein the downlink subframe set included M downlink subframes where M≥1, and the M downlink subframes are configured as Multicast Broadcast Single Frequency Network (MBSFN) subframes by the RN; and
transmit the ACK/NACK information through a backhaul uplink using the PUCCH format and resource in a single uplink subframe,
wherein, when the RN is configured with a PUCCH format 3 and when one physical downlink shared channel (PDSCH) is transmitted within the downlink subframe set, the ACK/NACK information is transmitted using a PUCCH format 1a/1b on a PUCCH resource configured by a higher layer for the PUCCH format 1a/1b.

10. A base station for receiving ACK/NACK information from a relay node (RN) in a wireless communication system, comprising:
a Rx module for receiving an uplink signal from the RN through a backhaul uplink;
a Tx module for transmitting a downlink signal to the RN through a backhaul downlink; and
a processor for controlling the base station including the Rx module and the Tx module,
wherein the processor is configured to:
perform a backhaul downlink transmission within a downlink subframe set through the Tx module, wherein the downlink subframe set includes M downlink subframes where M≥1, and the M downlink subframes are configured as Multicast Broadcast Single Frequency Network (MBSFN) subframes by the RN; and
receive ACK/NACK information through a backhaul uplink, in response to the backhaul downlink transmission in a single uplink subframe through the Rx module,
wherein, when the RN is configured with a PUCCH format 3 and when one physical downlink shared channel (PDSCH) is transmitted within the downlink subframe set, the ACK/NACK information is received using a PUCCH format 1a/1b on a PUCCH resource configured by a higher layer for the PUCCH format 1a/1b.

* * * * *